(12) United States Patent
Costantino et al.

(10) Patent No.: US 10,810,479 B2
(45) Date of Patent: Oct. 20, 2020

(54) CUTANEOUS INFORMATION DEVICES AND METHODS TO MANUFACTURE THE SAME

(71) Applicants: Peter Costantino, Westport, CT (US); Michael Gilvary, New York, NY (US)

(72) Inventors: Peter Costantino, Westport, CT (US); Michael Gilvary, New York, NY (US)

(73) Assignee: Idion, Westport, CT (US)

( * ) Notice: Subject to any disclaimer, the term of this patent is extended or adjusted under 35 U.S.C. 154(b) by 33 days.

(21) Appl. No.: 16/140,080

(22) Filed: Sep. 24, 2018

(65) Prior Publication Data

US 2020/0097791 A1  Mar. 26, 2020

Related U.S. Application Data

(63) Continuation-in-part of application No. 15/699,427, filed on Sep. 8, 2017, now Pat. No. 10,083,391, which is a continuation-in-part of application No. 15/295,144, filed on Oct. 17, 2016, now Pat. No. 9,996,789, which is a continuation-in-part of application No. 14/862,033, filed on Sep. 22, 2015, now Pat. No. 9,519,724, and a continuation-in-part of application No. 14/862,081, filed on Sep. 22, 2015, now abandoned, and a continuation-in-part of application No. 14/860,646, filed on Sep. 21, 2015, now Pat. No. 9,489,466.

(60) Provisional application No. 62/690,341, filed on Jun. 26, 2018, provisional application No. 62/690,413, filed on Jun. 27, 2018, provisional application No. (Continued)

(51) Int. Cl.
*G06K 19/077* (2006.01)
*G06K 19/07* (2006.01)
*B44C 1/17* (2006.01)

(52) U.S. Cl.
CPC ...... *G06K 19/07762* (2013.01); *B44C 1/1741* (2013.01); *G06K 19/0728* (2013.01); *G06K 19/07716* (2013.01); *G06K 19/07775* (2013.01)

(58) Field of Classification Search
None
See application file for complete search history.

(56) References Cited

U.S. PATENT DOCUMENTS

| | | | |
|---|---|---|---|
| 8,116,841 B2 * | 2/2012 | Bly | A61B 5/0205 600/391 |
| 2007/0029377 A1 * | 2/2007 | Hinckley | G06K 19/041 235/380 |

(Continued)

*Primary Examiner* — Christle I Marshall
(74) *Attorney, Agent, or Firm* — Anthony Handal; Mona Roy; Handal & Morofsky

(57) ABSTRACT

An identification device to be adhered to the skin of an animal having a top side and a bottom side comprising: a substrate with a printable surface with biocompatible pigment displaying visually discernible information disposed on the top side of the substrate; biocompatible adhesive on bottom side of substrate; an electronic component below the top side of the substrate comprising an electronic device with the ability to send, receive, and store information; and a carrier sheet, wherein the substrate and the adhesive are flexible, elastic, biocompatible, breathable, and comprised of material allowing for transmission of moisture and vapor at a rate that allows the device stay affixed to the skin for its pre-determined useful timeframe to slow down deterioration of components below substrate and to minimize skin irritation.

37 Claims, 19 Drawing Sheets

Related U.S. Application Data

62/618,782, filed on Jan. 18, 2018, provisional application No. 62/580,952, filed on Nov. 2, 2017, provisional application No. 62/531,863, filed on Jul. 12, 2017, provisional application No. 62/500,419, filed on May 2, 2017, provisional application No. 62/426,765, filed on Nov. 28, 2016, provisional application No. 62/377,786, filed on Aug. 22, 2016, provisional application No. 62/375,892, filed on Aug. 16, 2016, provisional application No. 62/359,104, filed on Jul. 6, 2016, provisional application No. 62/242,973, filed on Oct. 16, 2015, provisional application No. 62/365,988, filed on Jul. 23, 2016, provisional application No. 62/053,725, filed on Sep. 22, 2014, provisional application No. 62/657,240, filed on Apr. 3, 2018.

(56) References Cited

U.S. PATENT DOCUMENTS

| | | | |
|---|---|---|---|
| 2011/0025040 A1* | 2/2011 | Dominguez | G09F 3/00 283/75 |
| 2013/0096369 A1* | 4/2013 | Folkers | G06K 19/07327 600/33 |
| 2015/0182757 A1* | 7/2015 | Levine | A61H 23/00 601/46 |
| 2016/0004952 A1* | 1/2016 | Mei | G06K 19/07762 235/488 |
| 2016/0317057 A1* | 11/2016 | Li | A61B 5/6833 |
| 2017/0172485 A1* | 6/2017 | Makower | A61B 5/4312 |
| 2017/0372185 A1* | 12/2017 | Friant | G07C 9/27 |
| 2019/0021671 A1* | 1/2019 | Kumar | A61B 5/6832 |

\* cited by examiner

CUTANEOUS INFORMATION DEVICES AND METHODS TO MANUFACTURE THE SAME

CROSS REFERENCE TO RELATED APPLICATIONS

This application is a continuation of U.S. patent application Ser. No. 15/699,427 Visually, Optically and electronically Readable Frangible Device for Affixation to the Skin filed Sep. 8, 2017 and continuation-in-part of International Application No. PCT/US2015/051289, entitled, Security and Accounting Infrastructure, and Associated Cutaneous Information Device and Method, filed on Sep. 22, 2015, which claims priority to U.S. Provisional Application No. 62/053,725, entitled, Temporary Cutaneous Information Device and Associated Method and Multi-Patient Treatment Infrastructure, filed on Sep. 22, 2014. This application also claims priority of International Application PCT/US2017/048085, entitled, Improved Visually, Optically and Electronically Readable Frangible Device for Affixation to the Skin, filed on Aug. 22, 2017, as well as applications International Application PCT/US2017/040053 System and Method for Transitions of Care, filed Jun. 29, 2017, U.S. patent application Ser. No. 14/860,646, Transportation and Resort Infrastructure, and Associated Cutaneous Information Device and Method, filed Sep. 21, 2015, U.S. patent application Ser. No. 14/862,033, Temporary Cutaneous Information Device and Associated Method and Multi-Patient Treatment Infrastructure and U.S. patent application Ser. No. 14/862,081 Temporary Cutaneous Information Device, Associated Method and Resort Infrastructure both filed on Sep. 22, 2015, U.S. Provisional Patent Application No. 62/242,973 Method and Apparatus for Manufacturing Cutaneous Information Devices, filed Oct. 16, 2015, U.S. Provisional Application No. 62/357,240 Transitions of Care Information Device, filed on Jun. 30, 2016, U.S. Provisional Application No. 62/359,104 Skin Applied Point of Service Preparation Device Process and Design Technical Field, filed on Jul. 6, 2016, U.S. Provisional Application No. 62/365,988 Method for the Biocompatible Skin Safe Application of Multiple Color Images to the Skin filed Jul. 23, 2016, U.S. Provisional Application No. 62/375,892 Method For Biocompatible Skin Safe Application of One or More Color Images To the Skin Using Sublimation Printing, filed Aug. 16, 2016, U.S. Provisional Patent Application No. 62/377,786 entitled Improved Visually, Optically and Electronically Readable Device for Durable Affixation to the Skin filed on Aug. 22, 2016, U.S. patent application Ser. No. 15/295,144 Method and Apparatus for Manufacturing Cutaneous Information Devices, filed Oct. 17, 2016, U.S. Provisional Patent Application No. 62/426,765 Method For Biocompatible Skin Safe Application of One or More Color Images To The Skin Using Thermal Printing, filed on Nov. 28, 2016, U.S. Provisional Patent Application No. 62/500,419 Construct Design and Application of Cutaneous Information Device for Enhanced Physical Authentication Including a Streamlined Digital Authentication Process, filed May 2, 2017, U.S. Provisional Patent Application No. 62/531,863 Nontransferable Identification Device, filed Jul. 12, 2017. additionally, priority is claimed to U.S. Provisional Patent Application No. 62/580,952 Customizable Cutaneous Information Devices and Manufacturing Methods for the Same filed Nov. 2, 2017, and U.S. Provisional Patent Application No. 62/618,782 Cost Effective Cutaneous Information Devices With Enhanced Frangibility filed Jan. 18, 2018, U.S. Provisional Patent Application No. 62/690,341, Enhanced Cutaneous Information Device With Proximity Detection filed Jun. 26, 2018, U.S. Provisional Patent Application No. 62/690,413 Cutaneous Information Device System with Wireless Detection of Patron Location filed on Jun. 27, 2018, the disclosures of all of the above are incorporated herein by reference.

TECHNICAL FIELD

The invention relates to Cutaneous Information Devices (CID) skin worn devices for purpose of identification, data collection, electronic systems integration, physiologic and other skin applied sensing and delivery of dynamic, unique, authenticated and secure content as well as methods for manufacturing the same. Disclosed are methods for manufacturing preprinted CIDs that can be specifically designed to allow for the durable and reliable placement of variable information at the point of service.

BACKGROUND OF THE INVENTION

Today there is a wide range of products on the market facilitating the temporary application of decorative images to the skin. The same are generally commercially manufactured using a screen printing process, and may comprise of temporary tattoos for children or other products meant for adult consumers and more in the realm of jewelry, however these methods cannot be manufactured at point of service with variable data input. Products for creating homemade temporary tattoos are also available on the market, generally centering on the use of a computer and an inkjet or laser printer to print an image on a specialized sheet designed to receive the image from the inkjet printer and allow its transfer to a second adhesive bearing sheet to allow application to the skin of the wearer. In principal, such specialized sheets may be used to receive images from inkjet or laser printers, however, home systems use printers that were not designed for skin contact therefore typically use of printer ink or toner, which are not safe for skin contact.

Temporary tattoos are well known for aesthetic purposes, and generally include an ink transfer. Examples of such temporally tattoos are found in U.S. Pat. Nos. 3,898,357, 5,421,765, 5,578,353, and 5,601,859, the disclosures of which are incorporated herein by reference. Specifically, U.S. Pat. No. 4,522,864 to Humason et al. provides general background on the structure of temporary tattoos, as well as fabrication materials and methods.

U.S. Pat. No. 6,264,786 to Cromett (Mattel) issued Jul. 24, 2001 shows a user-created temporary tattoo structure and method of creating a custom temporary tattoo using a PC and printer, in which the user prints an image on a coated sheet, then covers the image with a film, attaches the film/image/coating laminate to skin, and removes a backing sheet to release the image on the skin. This allows a user to create an image on a computer, print the image using a computer printer, and then safely apply the image to human skin.

The use of cutaneously supported images as identifiers together with cooperating devices, systems, apparatus and methods in tracking, for the purposes of the security, safety, billing and other servicing of patrons at travel, recreational and other facilities, such as an airline terminal, resort, convention center, hospital or hotel, is disclosed in the referenced patent applications.

Despite the merits of the concept, conventional temporary tattoos have drawbacks. They are semi-translucent and print information appearing thereon can be difficult to read, especially on dark skin. A more opaque skin applique with high contrast information would be more desirable. These commercially made tattoos are also done using a large screen printing or digital printing process that is done in a factory setting. This does not make it possible to generate the tattoo with readable information both visually and machine read in real time at point of service. Desktop printers can create temporary tattoos at home, but the ink being used for the at home printers are not safe and the ability to print with a contrasting background is only available in the laser printer market, and in this sector the toners are not safe for skin contact. Moreover, temporary tattoos are not sometimes durable enough. In a protected environment, it can last a few days. In a theme park the pigments can last at most a few hours in a water park or at the beach and often it lasts a few minutes before beginning to degrade.

In addition, many temporary tattoos typically must be wetted with a warm wet sponge, washcloth or paper towel, and then dried thoroughly. This can take several minutes and is not easy to do with small, excited children seeking to enter an amusement park, and the parent must have access to a restroom inasmuch as the water and sponge cannot be included in the packaging.

Temporary tattoos may be allowed to remain on the skin for various lengths of time, ranging from just a few minutes to several days, depending on the whims of the wearer of the tattoo, the amount of washing and rubbing to which the tattoo is exposed, the amount of hair on the individual, the amount of sweat produced while being warn and the durability of the tattoo. Because of the potentially extended time of contact between the tattoo and a wearer of the tattoo, there is a realistic concern that the inks, toners or other materials used could be absorbed through the skin, resulting in possible injury to the wearer of the tattoo. Accordingly, the construction of temporary tattoos according to the prior techniques has been limited to the use of carefully selected, non-toxic inks. There is a need for temporary tattoos that may be made safely with a variety of inks, including those inks that may not be completely non-toxic, as may be found in some computer printers which durable enough to sustain long term wear, the elements and the hair and sweat of the skin and which can be manufactured at the point of service using variable data.

There is a need for a printing system to print out a frangible, non-toxic skin applied (cutaneous in the manner of a temporary tattoo) information device using a desktop sized printer which allows the device to be applied to an individual at the point of service for applications such as hotel industry, medical industry, travel industry and other such industries where on the spot identification is desired. Point of services implies the device must be the appropriate size to fit into the environment of application, must be generated and applied in reasonable time frame as to not disrupt the current operations. This device must have visual and machine-readable information, which will serve as a repository for information and a unique identifier.

Current manufacturing processes make it difficult to create a ready to apply CID. The materials used to manufacture a CID have elastic properties which make the manufacturing process and the application a challenge. Furthermore, the construct to allow durable variable information to be displayed is difficult to achieve again given the properties of the materials. Many companies develop sensors for various applications but these sensors are bulky and one dimensional. The CID construct is specifically designed to allow manufacturing process to be completed including the printing of variable information either at the manufacturing facility or at point of service which is durable, legible and reliable in any environment. The construct also allows the insertion of electronic components which can serve a variety of physiological measurement functions while at the same time authenticating and securing the interaction all through noncontact and wireless communication. This device is frangible therefore cannot be transferred and when removed the device is destroyed both visually and functionally.

SUMMARY OF THE INVENTION

Disclosed are non-transferable frangible skin applied or cutaneous information devices (CID) especially adapted for application on living human or other animal skin and methods for manufacturing the same. The device comprises multiple layers. In some embodiments, the device is fully prefabricated at an offsite manufacturing facility. In other embodiments, the device is partially prefabricated at an offsite manufacturing facility and customized at the point of service (POS).

The first layer (the carrier layer) is a carrier platform with a release agent or an anti-stick coating. The second layer (the printed layer) is a substrate with adhesive on side. The adhesive comprises a biocompatible adhesive on side and on the other side is a substrate suitable for receiving and carrying printing dye and other visual, optical or electronically read data, perhaps by being treated with a varnish to allow for print bonding. A geometric frame or other stabilizing layer is added on the printed side to give the CID temporary structural integrity when the carrier platform is removed. In practice when attaching the CID to skin, the carrier platform is pulled off and the adhesive side is placed on the skin. Once placed, the geometric frame is removed leaving the CID attached to the skin.

The geometric frame layer provides structural integrity for the device once the carrier sheet is removed for application to the skin. Once the carrier layer is removed the material will be very flimsy without a frame. For POS applications, the carrier sheet is also needed to provide enough structural integrity so the device can be fed through a printer. Depending on manufacturing preferences, the frame may contain a kiss cut, coin purse cut or a corkscrew cut for ease of removal. The cuts may be placed Full way across the middle to allow for removal in two pieces or half way across the middle for removal in a single piece).

The CIDs may be manufactured in whole or in part in a commercial manufacturing facility to marry a carrier layer, a print layer, and if so desired an electronic component layer such as an RFID inlay layer or other electronic device which can send, receive or store information sandwiched in between with the interface options described above. There may or may not be some printed static information on the device. In a commercial manufacturing setting, these layers added separately and just cut around to make the frame.

For Point of Service applications which require onsite customization, the fully assembled device may be run through a printer for additional customization with additional printing. The device might be run through a printer and then married to an additional layer with an RFID chip on it and then the structural backing so that the printed layer can be run through standard desktop printers. Similarly, a protective substrate may be printed on or otherwise applied over the printed material to further enhance the longevity/integrity of the printing.

In some embodiments, RFID devices may be included in the construct by adding a metallic layer with an integrated circuit. In another embodiment, the printer will include the ability to program the RFID or like device. In preferred embodiments, there is an additional layer comprising a substrate, RFID inlay (usually comprising a die, antenna and adhesive connecting die and antenna, antenna PET layer), and skin safe adhesive on at least one side between the carrier platform and the printed layer. The adhesive side will interface with the carrier platform and the RFID inlay could be placed on either side of the substrate. If on the side facing the carrier platform, the RFID inlay will interface directly with the skin allowing for sensors to gather data from the surface of the skin. Placed on the other side, the RFID inlay will interface with the adhesive side of printed layer.

It is also contemplated that the additional layer may not be necessary, and that the RFID inlay will be printed on the adhesive side of the printed layer.

wherein the substrate and the adhesive are flexible, elastic, biocompatible, breathable, and comprised of material allowing for transmission of moisture and vapor at a rate that allows the device stay affixed to the skin for its predetermined useful timeframe to slow down deterioration of components below substrate and to minimize skin irritation.

In alternative embodiments, the substrate has more rigid edges, however still elastic enough to be comfortable and durable, in lieu of needing a geometric frame. In preferred embodiments, the CID that can last weeks, even in an aquatic or other more extreme environments, and yet which can be intentionally removed quite easily.

This adhesive can be pressure sensitive, activated by a solvent, water, UV light, heat or any other method of adhesive activation.

In another embodiment, the object of the present invention is to provide a CID with a white (or other solid color) background, colored contrasting background and clear base layer which is the layer that will come in contact to the skin when applied. This clear layer will serve as a functional barrier to the skin.

In another embodiment, one layer of the construct will comprise of a prefabricated RFID antenna and transponder electronically programmed with unique information. The RFID components will also be MRI compatible. The present invention also contemplates the deposit of conductive members, for example made of metal and providing a wide range of functionalities, such as information input, information display, RFID functionality and branding. In another embodiment, the construct will include a working RFID, circuit, UHF or NFC or other non-contact communication devices. Data processors such as circuits, microchips and microprocessors can be added to the construct in conjunction with conductive components to create a skin wearable computer-processing unit. Security components such as holograms can be added in the final step for authentication. In certain embodiments, the NFC or UHF enabled device would be powered by flexible paper batteries. For medical uses, the device would be MRI compatible and would use MRI compatible metal or palate batteries.

In addition to RFID, the construct may also comprise of UHF or NFC, non-contact communication devices, antennas, copper or silver for antimicrobial properties, and glow in the dark properties.

In another embodiment, the paper may contain particular materials for authentication and security, including but not limited to small RFID chips, fluorescents and UV activated inks.

In one embodiment, there will be multiple layers of adhesive with unique adhesion strengths and properties. A portion of the RFID antenna, circuit or other non-contact technology will be placed throughout multiple layers of the adhesive. Therefore, when the CID is removed from the skin the circuit or connection will be severed rendering the CID noncontact technology inoperable.

The CID is frangible and nontransferable. When the CID is removed from the skin the visually read information will no longer we legible. When the CID is removed from the skin the RFID antenna, circuit or other non-contact technology will be rendered inoperable.

In an alternative embodiment, the adhesive particles will be included in the formulation of the paper. Therefore, there will be no need to add an additional adhesive layer and these adhesive particles which will bond the CID to the surface of the skin can be activated with a solvent, water, UV light, pressure, heat or any other adhesive activation process.

In an alternative embodiment, the paper could include or other materials or substances to the CID to be used in connection with Laser, IR, UV light or any electromagnetic technology.

Bioluminescent ink (light emitting from organic material) and other such materials can be included in the construct with the device in any number of environments to enhance the capability or effectiveness of the product and also be used as a method of applying the device to an individual.

The CID through specialized inks, adhesive, or other embedded devices can also provide electronic illumination. Inks used may include metallic ink (reflexive inks), glow in the dark inks, inks that change their physical properties, sometimes in ambient light, sometimes activated by a light shined on it or sometimes by the sun; inks that retain a charge and emit over time such as thermal ink. In some embodiments, there is provided a battery or other power source (e.g., Williot technology which is powered by ambient noise). Additionally, energy for power can come from ambient light, solar, static, friction, motion/kinetic, UV, body temperature, heat radiating off the body. LED can be embedded in adhesive, perhaps powered by ambient body temperature, solar power, or battery powered by kinetic energy.

The CID is a temporary identification device that securely and durably identifies individual in any number of settings. Currently there is a need to create the CIDs at point of service with the added benefit of printer mobility, the printer must be able to travel to the individual and not make the assumption that there will be an admission area. By reliably identifying the individual before application, the CID can be coupled with a scale to measure the weight, prevent errors in a medical setting and include any number of other data points which could be relevant to any number of situations, for example emergency situations.

In preferred embodiments, the CID would frangible, waterproof or water resistant, have contrasting layers, with all components that may come into contact with the skin being biocompatible.

An additional protective layer can be added to increase longevity and increase durability. The CID may come blank or with some static information preprinted or partially printed. For some applications, it may be advantageous to have a CID that is customizable by providing a CID that is suitable for Point of Service printing.

In preferred embodiments, any RFID used would have no harmful trace metals in the components including the inlay or adhesive used to secure the integrated circuit or die.

In preferred embodiments, the CID would need to be activated at the point of service to be customized in real-time.

There can further be a protective transparent layer or coating over the readable data layer.

Regardless of where the device is finished and ready for use, the carrier layer will incorporate a release agent that will allow it be easily separated from the rest of the device. While the adhesive side that will interface with the skin will have to be both biocompatible and strong enough to adhere to the skin when the geometric frame is pulled off Put another way, it should be relatively easy to separate the carrier layer from rest of the CID but the adhesive has to be adhered to the skin with enough force so that when the geometric frame or structural layer is pulled off printed side of the outer layer, then the rest of it still stays adhered to skin. In certain embodiments, the release liner is split halfway along middle to easily expose the adhesive. The release paper is perforated to remove individual discs.

In certain embodiments, a QR code, bar code or other optically read code is used in combination with the electronic components. The QR code will deliver information, data, or call to action that is complimentary to the electronics components.

Other embodiments of the invention are also disclosed herein as appears more fully below.

To create point of service and single step printing of frangible, non-transferable CID with variable data input several factors need to be considered. As the inventive CID is meant to include a visual identification information like name or date of birth plus machine-readable code, such as a barcode, QR Code or Datamatrix, there is a need for a contrasting (preferably white) background needed so that the information is actually machine readable.

The contrasting layer can include ink, a substrate or white adhesive. The ink or toner must be skin safe. The printer can also add in the adhesive that can be a separate layer or interspersed with the ink. In preferred embodiments, perforated paper is used so that the CID can be easily removed from the sheet for application and can also have a substrate that when perforated can perforate the substrate as well. In one embodiment, the adhesive is directly added to the toner or ink cartridges so no additional step is needed, furthermore metal ink would be available for printing RFID, tagents and other security features like UV and nano-RFID chips for authentication. The printer would produce a CID which has excellent resolution and print quality on demand on a non-industrial setting.

Presently, there is no biocompatible system that can print variable data at home that is a skin safe with adhesive that lasts 21 days. Such a system is particularly useful when there is a need for a white background not only to draw a contrast between words and lettering but for the easy identification of quadratic codes, bar codes and datamatrix codes. The frangible, machine readable device is particularly useful in settings where identification and linkage to a remote system is needed for not only immediate identification but also for safety reasons.

The CID preferably comprises a contactless device using a communication protocol such as BLUETOOTH. The CID would be used in connection with a system comprising software allowing an authorized smart device with optical or noncontact communication capability to communicate with the CID whether using optical readers, RFID technology, BLUETOOTH communication protocols or any other wireless technology available. The use of a Bluetooth enabled device allows it to be able to link to other systems. In other words, the CID can be used to connect (via previously described methodology) not only to the centralized server but also to other BLUETOOTH enabled devices (as discussed below). Further, the use of the wireless connection is easily incorporated into tele-health immediately following discharge where the patient is at home with monitoring equipment. The use of BLUETOOTH enabled communication also allows the CID to be integrated with a wearable device such as a smart watch which itself may have monitoring and communication capabilities. In addition to smart wearables, the CID can be connected to home assistant systems like GOOGLE HOME and AMAZON ECHO, other smart home assistant devices.

Within a hospital setting, it is envisioned that there may be various monitoring done via sensors which can be linked to a large device (e.g. a hospital bed as a way to determine location) or to the device itself. In other words we know where the bed is, a reader on the bed can scan the CID and then we know the location of the individual with a active or passive system and perhaps we can pull room number from identification just from a paired and authorized phone or other portable device.

By periodically sending out signals and interfacing with paired devices, the CID is in active communication with the devices and linked to not only the hospital system but the centralized server as discussed in the Transitions of Care application as referenced above. On distinct advantage is that in case the patient is removed from the room for any reason, the pairing is cut off and false readings will not be downloaded to the system.

The wireless contact devices can be directly printed on the device. Bluetooth enabled antennas are currently manufactured on PET. In an alternative embodiment, one can print antennas on PU or print on perforated/flexible PET and could be pre fabricated or attached at POS if printing is done on site.

In an alternative embodiment, a Bluetooth (or similar technology such as BLE, backscatter communication) enabled antenna could be run on an embedded battery alternative sources such printed battery.

When the above system is paired with Bluetooth enabled physiologic sensing technologies to create a patient ID that not only conveys identification and medical information, but also engages in real time, wirelessly transmitted, physiologic sensing and databasing of information, i.e., morning blood draws to find out the patient's blood chemistry status, etc.

In preferred embodiments, applying intelligent analysis and optimizing diagnosis and treatment, including diagnostic and treatment plans and providing intelligent alarms and alerts to support and optimize clinical decision making. The biometric (physiological and health) data may gathered by professionals who are collecting and inputting information into the system or in alternative embodiment can collect real time from a variety of sensors including vital sign monitors, ventilators, infusion pumps. The smart devices may include devices for acquisition and analysis of electrocardiogram, electroencephalogram, electromyogram, blood pressure, impedance, vascular resistance, cardiac output, biochemical, genetic, proteomic, molecular, and other types of health and environmental data. The system would be designed to accept and recognize new data from wireless physiological sensors in addition to the integrated barcode scanning or RFID tag or MEMS tag or other types of automatic entry of information at the bedside in a real time. The system of the present invention can also adapt, compare and merge new information with the existing data in the system. In the practice of this invention, health related information is preferably monitored on a periodic, or quasi-periodic basis, meaning that data are taken or read and recorded periodically using on a rules-based system.

The periodic recording of data may extend for short periods such as minutes, hours or days (depending on the data needed), or may extend over a longer period depending on whether the patient is in in patient in a hospital or outpatient—outside of a hospital facility. Herein "health related information" is used generically to mean all forms of information relating to health, including physiological data that include but are not limited to blood pressure, cardiac output, vascular activity, temperature, respiration, cardiac, abdominal, and other electrical, mechanic, sonic, biochemical, and biophysical processes in the human body, as well as other information related to human life, including demographic (age, gender), environmental (pollution, job conditions), and psychological data, life styles, exercise activities, etc. Tracking changes in health or medical data, using individual's own data as a personalized reference, allows one to improve the accuracy of medical diagnosis.

Comparing current data with individual's historical test results, such as previous electrocardiogram (ECG), blood pressure, heartrate, etc., helps physicians in differentiating acute changes, which usually require proactive management, from chronic abnormalities. In addition, comparison with individual's historical data also helps in exposing subtle or gradual changes. For example, patients with chronic ischemic heart disease often have gradual narrowing of coronary arteries, which is associated with gradual, subtle changes in the electro cardio graphic STT-complex, Which are difficult to detect. Other symptoms may include slowly diminishing tolerance to physical exercise, which can also be difficult to detect.

By pairing the Bluetooth enabled CID with other Bluetooth enabled devices, there is effective authentication that the data being taken is the data of the correct person thus avoid any mix-ups or miscommunication. This is not only helpful in hospital setting but even more useful in non-hospital settings (e.g. rehab, nursing home) where rotating staff may not be familiar with the patients and the patients themselves lack focus communication skills. Sensors on body or near body—so constantly broadcast to whatever it willing to receive communication. In alternative embodiments, there are periodic pulses sent to ensure that the devices are connected and when a connection is lost, an alarm may be sent to a remote monitoring facility for follow up.

Incorporated directly into the CID, a Bluetooth enabled sensor designed to function as a thermometer to monitor the wearer's body temperature. A connection between other monitoring or processing devices would acts as alert to medical personnel if the temperature was abnormal or displayed other characteristics that were unusual or, based on a predictive algorithm, correlated with or likely to result in increased risk to the patient. Outside of a hospital setting using the CID as a thermometer would be a particularly useful tool where the patient is non verbal or has compromised communication skills. A caregiver could get an alert on their phone if the patient had a high fever, if the temperature was unusually low or if temperature fluctuated in a way that predictive algorithms indicate are a risk factor to the patient.

An alternative embodiment incorporates additional BLUETOOTH enabled sensors to measure skin temperature, resting pulse rate, heat loss, breathing patterns, body movement while sleeping. Combined with appropriate predictive algorithms, this can be used for predicting bodily functions, such as peak fertility times and managing ovulation cycles.

BRIEF DESCRIPTION OF THE DRAWINGS

The operation of the inventive method and apparatus will become apparent from the following description taken in conjunction with the drawings, in which.

DETAILED DESCRIPTION OF THE EMBODIMENTS

Figure 1:
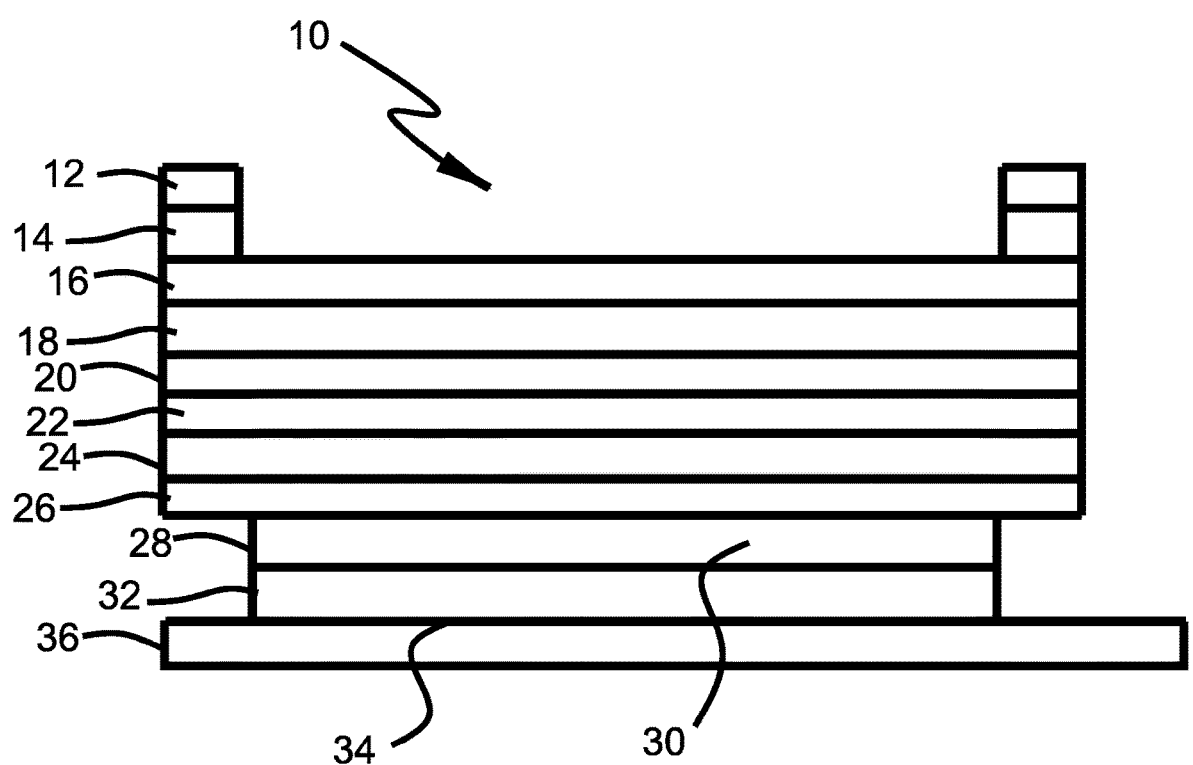
FIG. 1 is a cross sectional view of a ready to apply CID constructed in full at a manufacturing facility with a geometric frame.

FIG. 1 shows a preferred embodiment of an identification device, constructed in full at a manufacturing facility so that it is ready to apply CID. CID 10 comprises a geometric frame 12 with its adhesive layer 14 on the side on top of a protective substrate layer 16 with its protective substrate adhesive layer 18 on top of printed visually or machine read data 20 on a printing foundation layer 22 making up printed substrate layer 24 which includes on its other side printed substrate adhesive layer 26 abutting electronic device 28 resting on electronic device substrate layer 30 which includes on its other side electronic device adhesive layer 32, release substance layer 34, carrier sheet 36. Electronic device substrate layer 30 shown as a dotted line is the electronics for the device. The tab 36 is used to provide easy release of the carrier sheet from the other layers. The kiss cut 17 allows the geometric frame to be separated from the protective layer 16.

Protective coating 16 will increase the durability, extend the useful life of the device by protecting the components of the device from the wear and tear or water damage.

Geometric frame 12 provides structure and rigidity to the construct during application of the device and includes adhesive layer 14 to attach the geometric frame 12 to protective substrate layer 16 which protects the components of the device from external forces and the environment. Protective substrate layer 16 may comprise a thin sheet of polyurethane or similar materials. Protective substrate layer 16 further comprises adhesive layer 18 interfaces with ink/dye layer 20 and protects it from degradation.

Data 20 may comprise visually readable and/or optically scannable data may comprise skin safe dye, ink or toner. The printed can be applied using any number of printing techniques including sublimation, thermal, laser, inkjet printing, flexographic, direct or indirect transfer. These dyes can generate visual data which can include but not limited to identifying information, name, date of birth, ticket number, identification number, employee ID, prison inmate number, scout troop number, school precinct for class trips, advertising, an image of the person wearing the inventive device and/or any other information which serves a functional, efficiency or security purpose. The present invention contemplates printing UV long wave and short-wave dyes, fluorescent dyes, IR invisible dyes, light fast and non-lightfast dyes, glucose monitoring inks, and electrically conductive inks.

Printing foundation layer 22 is preferably either has properties to allow for durable printing to take place or treated with a varnish or other substance to allow for and retain any printing. Substrate layer 24 provides the construct for printing onto and for attaching electronic components. The substrate is durable enough to withstand application to the skin in even harsh environments yet flexible and elastic enough to be comfortable on the skin. In one embodiment the substrate layer is so thin it is almost imperceptible and only has enough durability and tensile strength to hold the components in place while on the skin.

The adhesive and the substrate must also have the appropriate characteristics to handle moisture either from external sources or that naturally present on the skin, such as sweat.

Printable substrate 24 (alone or in conjunction with printing foundation layer 22) is suitable for receiving ink in a variety of printing processes, such as sublimation printing, laser printing, xerographic printing, inkjet printing, flexographic impact printing using a ribbon similar to an electromechanical typewriter, or conventional offset or other conventional printing process. Substrate 24 is preferably of low strength and will break apart if subjected to relatively low magnitude mechanical stresses or impacts in any direction. In this application, this characteristic is referred to as frangibility. Insofar as substrate 24 is the base for the applied inventive CID after application, its frangibility makes it substantially impossible to remove, thus adding a measure of security to the device as an identification device. More particularly, frangibility when does it substantially impossible for the device to be moved from one person or thing to another.

Substrate 24 is preferably perforated and just thick enough to bond to the adhesive and serve as the foundation for dyes and other electronic components described throughout. This will make the substrate 24 frangible so as to prevent intact removal of the substrate or its readable components, thereby preventing transfer to another individual. The substrate 24 must be durable enough to withstand/tolerate printing and preferably impermeable to the dyes printed thereon. The substrate 24 (alone or in conjunction with printing foundation layer 22) would also be robust enough with proper moisture vapor transmission rates, channeling and other moisture handling properties to prevent any effects from body fluids such as sweat as well as the adhesive to interfere or interact with the data layer 36 or the integrity of the entire device. In another embodiment Substrate layer 24 will have channels on the adhesive layer to allow moisture to escape more readily.

Substrate layer 24 there may be printed visually discernable information 20, optically readable codes such as bar code, QR, datamatrix or any other visually machine read algorithm. Substrate layer 24 has a Printable layer varnish 22 which allows the printed layer to be bonded to the substrate. Preferably, the substrate 24 will be no thicker than what is necessary to bond the adhesive to the lower surface of the substrate and for that substrate to carry components of layers 20 and the identifying print information on the upper surface of the substrate. The substrate 24 is durable enough to withstand application to the skin in even harsh environments yet flexible and elastic enough to be comfortable on the skin. The adhesive 26 and the substrate 24 must also have the appropriate characteristics to handle moisture either from external sources or internal such as sweat.

The substrate 24 itself may be white in color or a contrasting color, though other colors may prove preferable depending upon the particular application, i.e., glow in the dark, fluorescent, etc. This coloring will serve as a contrasting background making the visual data deposited on the substrate (in the next step) easier to read and more durable. As part of the printing process a white coloring may be added to the substrate 24 to create the contrasting color.

Visually readable data 20, which can be read with the human eye, generated using skin safe dye, ink or toner can be applied using any number of printing techniques including sublimation, thermal, laser or inkjet printing. These dyes can generate visual data which can include but not limited to identifying information, name, date of birth, ticket number, identification number, employee ID, prison inmate number, scout troop number, school precinct for class trips, and any other environment where identifying information serves a functional, efficiency or security purpose. For security and authentication these dyes can also could include but not limited to UV longwave and shortwave dyes, fluorescent dyes, IR invisible dyes, light fast and non-lightfast dyes, nano-sized RFID chips, glucose monitoring inks, electrically conductive inks which when attached to a microprocessor or microchip and a power-source can complete an electrical circuit.

The visually readable layer may also comprise dye or inks that change their physical properties. activated by perhaps by ambient light, activating light or sunlight.

Data codes can be added as part of the visual display printed layer 20 such as Quick Response (QR), data matrix, bar codes or any other algorithmic code can be read with an optical electronic device can also be added to the construct. These codes will allow an optical electronic reader to pull unique identifiers from the device. These identifiers can be randomly generated codes which when used with a data management system will allow identification, tracking or data manipulation. These codes can serve as a secure form of data communication allowing the reader to pull information from the skin worn device and also communicate back with the device. Given the prevalence of optical visual code readers, the interaction between these codes and the individual can serve any number of purposes for the wearer of the skin device and/or a third party reading the device.

To maximize reliability of printed optical information components, substrate 24 may be white or have a color that contrasts with the printed information. Glow in the dark, fluorescent, etc. coloring may be advantageous depending upon conditions of use. As an alternative to having a white or colored material serving as a substrate the printing process for applying printed information they further comprise applying a white background pigment to the substrate to create contrast.

In accordance with a particularly preferred embodiment of the invention, CIDs are manufactured using glow-in-the-dark Components UV activated under a black light as well as a security measure, to provide for identification of a user in the dark. This has the advantage of making it unnecessary to disturb users by turning on lights during sleep. Moreover, it may also save time in emergency situations. CIDs may be made to glow in the dark by several techniques. For example, glow-in-the-dark pigments may be mixed into the adhesive, which remains on the skin of the user while the badge is being worn. Such phosphor pigments may be of any color, and may be used for color-coding purposes. Green phosphors are preferred for their longer persistence, although blue phosphors have the advantage of brighter light emission. In some cases, the adhesive has an LED embedded which can be taking power from temperature, from sun, or stores from motion.

It is also possible to mix glow-in-the-dark phosphor pigments with transparent thermoplastic ink material to make a glow-in-the-dark ink for laser printers. Additional versatility may be achieved by using transparent tinted red, blue and yellow phosphorescent ink pigment formulations with a black pigment formulation. In this case the black pigment formulation would be of conventional design and would be used to depict alphanumeric and/or image data, while the glow-in-the-dark pigments may be used for tinted backgrounds, identification background patterns, and so forth. Still another possibility is to utilize a five-ink cartridge laser printer where four of the ink cartridges are of conventional design and the fifth ink cartridge contains a phosphorescent ink formulation, which acts as a light source to improve visibility in the dark.

Adhesive layer 26 on the non-printed side of substrate 24 attaches to electronic device (e. g., RFID inlay) 28 which bonded/married to electronic device substrate layer 30.

The electronic device 28 may include electronic components i. e. electronically readable, devices such as electrical circuits, processors, resonant, RFID devices, UHF or NFC, noncontact communication devices, antennas, microchips, printed circuitry, flexible paper batteries, printed battery, sensors or other printed or nano-printed electronics.

CID can also incorporate biosensors that can measure skin or core temperature changes, heart rate, hydration, UV Exposure, glucose level (using glucose ink or glucose sensor for example) and use the wireless transmitter to send the information to an eternal device or reader. Thus, the device could be used to monitor for basic measurements that are relevant in any setting in or outside of healthcare and can be used as an early indication for medical conditions heat exhaustion, hypothermia, sepsis by measuring biometrics such as salt content, foreign compounds and even dehydration. The data would continue to save as frangibility of the device is maintained since as the substrate stretched, circuit breaks and any local data is lost.

In one embodiment all the data is saved when the product is removed but the identifying personal information does not exist.

Wireless device may be any electronically readable device such as an electrical circuit, processor, resonant circuit, active or passive RFID device (optionally a nano-sized RFID chips), UHF, NFC, wireless communication devices, antennas, microchips, printed circuitry, printed battery, sensors or other printed or nano-printed electronics. The electronic device can also be shaped in a way that has aesthetic value such as a butterfly, diamond, sun or flower. For example, the RFID inlay antenna can be in the shape of a diamond. This diamond shape has aesthetic value when seen through the printed and substrate layer, functional effectiveness, and serves as a visual cue for status or access to a particular location. For example, circular shape allows access to the facility, diamond shape allows access to the VIP section. Other shapes can be used depending on the desired uses. Additional aesthetic additions can include textured material. Perforations can also be added to add aesthetic and functional value as described above.

In accordance with a preferred embodiment of the invention, a passive RFID device comprising a chip and printed circuit antenna are provided. Preferably, substrate is no thicker than what is necessary to support adhesive and informational components under normal wear and tear, but thin enough to be frangible upon the application of force during, for example, an attempt to remove device Electronic devices 28 may use noncontact communication technology such as RFID, UHF or NFC and other non-contact communication devices. The electronic device 28 may include electronic components i.e. electronically readable, devices such as electrical circuits, processors, resonant, RFID devices, noncontact communication devices, antennas, microchips, printed circuitry, printed battery, sensors or other printed or nano-printed electronics. Wireless device may be any electronically readable device such as an electrical circuit, processor, resonant circuit, active or passive RFID device (optionally a nano-sized RFID chips), wireless communication devices, antennas, microchips, printed circuitry, printed battery, sensors or other printed or nano-printed electronics.

Types of RFID and Bluetooth protocol enabled devices include Low frequency RFID, Near Field Communication RFID, Ultra High Frequency RFID, and Bluetooth Low Energy. These microchips can store significant amounts of information. These identifiers can be randomly generated codes which when used with a data management system will allow identification, tracking or data manipulation. These codes can serve as a secure form of data communication allowing the reader to pull information from the skin worn device and also communicate back with the device. Given the prevalence of near field communication or ultra-high frequency RFID and Bluetooth readers, such as smart phones, tablets, watches and the like, the interaction between these technologies and the individual can serve any number of purposes for the wearer of the skin device and/or a third party reading the device. In certain embodiments, an MRI compatible power source for non-contact communication (such as RFID or BLUETOOTH compatible components) would be embedded in the CID. MRI compatible metal or palate batteries would be used in connection with the CID to enhance functionality.

These devices can also contain a variable rolling code which would increase the security and functionality of the device by creating a counter within the chip that will prevent anyone from accessing or using the chip without the proper rolling code at that particular moment.

These devices add a level of security and functionality over optically read codes. These devices can store more information, be reprogrammed, keeping a rolling count of the number of times the device was read and a variable rolling code for authenticity to increase the security of the CID. This functionality creates any number of advantages given the application. The rolling code in addition to counting can also dynamically tailor the information being displayed based on the count or number of times the CID is read. For example, on the first read an instructional screen can be provided to educate the user. On the second read the instructional video can be replaced with a highlighted tutorial and on the third read the instructions are replaced with a link to more information. Furthermore nano-sized RFID particles can be added at this stage used to confirm the authenticity of the skin worn device. In another embodiment, a flexible metal sheet would serve as the substrate layer and an RFID could be printed thereon. print on the metal itself. In preferable embodiments, the RFID would have to have a white layer on it.

Data processors such as circuits, microchips and microprocessors can be added to the device in conjunction with a conductive ink to create a skin wearable computer-processing unit. Security components such as holograms can be added in the final step for authentication ideally in layer 16. Layer 16 also serves as a protective layer to protect the contents of the device in layer 30 from the outside environments.

On the other side of electronic device substrate layer 30 is adhesive layer 32. Adhesive layer 26 has a larger surface area than layer 30. Adhesive layer 32 faces carrier sheet release substance layer 34 (e. g. silicone) on carrier sheet 36 which comprises a suitable material such as paper or plastic. Carrier sheet 36 is the platform by which the device 10 is carried.

Carrier sheet 36 is treated with a release agent 34 to allow for easy separation from the adhesive layer 32. This non-stick coating or release agent allows the rest of device 10 to be removed as a single mass from release layer 34. In use carrier sheet 36 is pulled off adhesive layer 32 and device 10 is applied to the patient/wearer. Geometric frame 12 which creates the rigidity and structure necessary to maintain the structure of device 10 and its components during application to the surface of the skin after carrier sheet 36 is removed. Without frame 12 maintaining the two-dimensional architecture of device 10 it would become deformed, wrinkled, and potentially not applicable to the surface of the skin. Once device 10 is applied to the skin, Geometric frame 12 can be removed and discarded. The frame 12 can encompass all or part of the surface area of the construct. Frame 12 also can create a window by which the point of service printing of variable data can take place. This window is needed to allow the printer to apply the necessary data directly onto print ready substrate 22 for visual and optical reading.

In an alternative embodiment, the frame 12 is replaced with a structural layer that covers the entire area of the CID.

In an alternative embodiment, electronic device 28 may be on the side facing release substance 34 so that when the CID is put on the skin device 28 is in direct contact with the skin.

In an alternative embodiment, the substrate layer 30 can be omitted. Depending on the end user's needs, this construct would further enhance the frangibility (thus non-transferability and security) of device 10 since the substrate layer adds structure and strength to electronic layer.

Suitable adhesives may include hydrocolloids, acrylic, silicone, cyanoacrylate (CA) 32 or a combination of these adhesives. Hydrocolloids, silicones and acrylics are commonly used in skin applied applications.

Those skilled in the art will optimize the adhesives depending on the end use of the device. For example, the adhesives should be skin safe. Frangibility is critical feature of the device which prevents the CID from being removed from one individual and placed on another. Once the device is applied to the skin the device cannot be removed without being destroyed both visually and electronically. The device when removed with have weak points and/or perforations to prevent the device from being removed from the skin in one piece. The electronic components will have weak points manufactured into the device such that when the components are removed the connection is severed and the electronic components are destroyed. However, in order to maintain frangibility of the device so it cannot be removed and reused, the adhesive may be applied in a manner where the printed layer 20 would be damaged when the CID is removed from the user's skin.

One of the methods of effectuating frangibility in accordance with the invention is to also have manufactured weak points. More particularly, if the device is removed from the individual, critical components will fracture and thus prevent the device from functioning. For example, the antenna associated with the circuit in an RFID device may comprise a spiral shape metal foil disposed on a perforated substrate which easily reps under the application tension, thus separating the metal foil antenna into two or more sections, thus destroying its operability. In applications where frangibility is desired, even when the electronic components are flexible the CID will still have a breaking point or weak point to allow for frangibility. Making the inventive device difficult or impossible to remove while preserving functionality gives the benefit of making the system employing the device more secure. Electronic device 28 will be placed below the substrate 30. In this configuration, the electronic component or sensor will be in direct contact with the skin when applied and be able to extract physiologic data in real time from the surface of the skin such as using sweat or blood for fluid analysis to measure temperature, glucose, salt content, blood alcohol level or detect the presence of other substances.

In some embodiments, to increase durability during application, the skin is prepped with an antibacterial solution or alcohol to cleanse the application area. The skin area can also be prepped with a material like Mastesol™ or Skin Tac™ that serves as a primer making the skin tacky and increasing the bond between the skin and the adhesive layer 32. Next, the carrier layer 36 will be pulled off. This will expose adhesive layer 32. Adhesive layer 32 is then pressed against the skin with reasonable force for bonding. Finally, after adhesive layer 32 is sufficiently cured to secure device to the skin the geometric frame layer 12 is removed by bulling at the kiss cut on the geometric frame 12.

Figure 2:
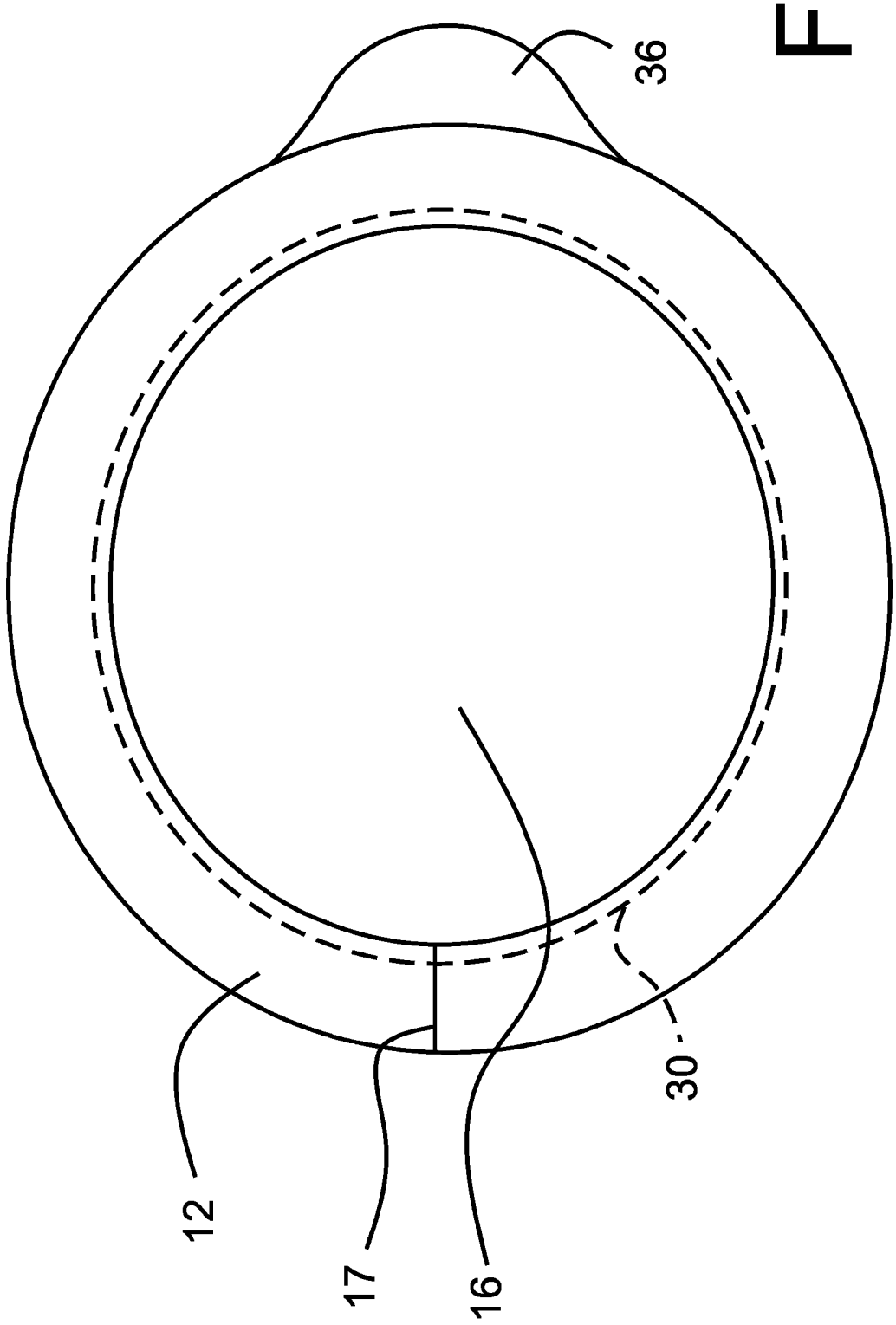
FIG. 2 is a top view of a ready to apply CID fully constructed or point of service ready.

FIG. 2, shows a top view of the embodiment shown in FIG. 1, (the view that would be visible to the user) showing only three of the visible layers namely, geometric frame 12, protective substrate layer 16 through which ink/dye 20 would be visible from the other side, and electronic device 28, electronic device substrate layer 30, electronic device adhesive layer 32, release substance layer 34, carrier sheet 36.

Electronic device substrate layer 30 shown as a dotted line is the electronics for the device. The tab 36 is used to provide easy release of the carrier sheet from the other layers. The kiss allows the geometric frame to be separated from the protective layer 16.

In accordance with a preferred embodiment of the invention, a passive RFID device comprising a chip and printed circuit antenna are provided. Preferably, substrate is no thicker than what is necessary to support adhesive and informational components under normal wear and tear, but thin enough to be frangible upon the application of force during, for example, an attempt to remove device. The substrate is durable enough to withstand application to the skin in even harsh environments yet flexible and elastic enough to be comfortable on the skin. The adhesive and the substrate must also have the appropriate characteristics to handle moisture either from external sources or that naturally present on the skin, such as sweat.

As mentioned above CID is in many applications ideally frangible, it would break apart and be destroyed if a removal attempt was made. By frangible is meant tendency to deteriorate under physical pressure, for example attempts to remove the same. The result is a measure of security. The CID is designed to be nontransferable. Any attempt to remove the CID, intentional or non-intentional, will essentially destroy the CID. Likewise, deterioration over time a provided an additional degree of security. The frangible CID disintegrates when it is removed and thus cannot be transferred and is functionally inoperable when it is attempted to be removed.

The device can be made frangible in various ways. In preferable embodiments, this is done by perforating the substrate if removal is attempted the device will rip apart and therefore rendered nonfunctional and destroyed. The stress necessary to pull disc off exceeds strength of the adhesive on the wire (maintain functionality until removed. If removal is attempted with acetone the device will also be destroyed. Due to these attributes, the device is nontransferable.

Also, the strength is the adhesive will exceed tensile strength of the substrate making it impossible to remove the shield in a single piece. Additionally, an RFID can be printed in metallic ink making it impossible to remove in one piece and could have a weak point not allowing the antenna to be removed in one piece. In an alternative embodiment, body temperature would cause adhesive that the antenna is surround by changes it properties. The user could then pull the inlay apart in 2 pieces and break the antenna. The adhesive could also be woven through inlay so it would pull apart when removed. The circuitry itself could be manufactured to be less durable at high temperatures. Additionally, rather than the circuit being printed on nonflexible or rigid substrate as they are now, the circuitry or antenna on the CID can be printed directly on a flexible or frangible substrate such as polyurethane thereby increasing the frangibility of the CID.

Figure 3:
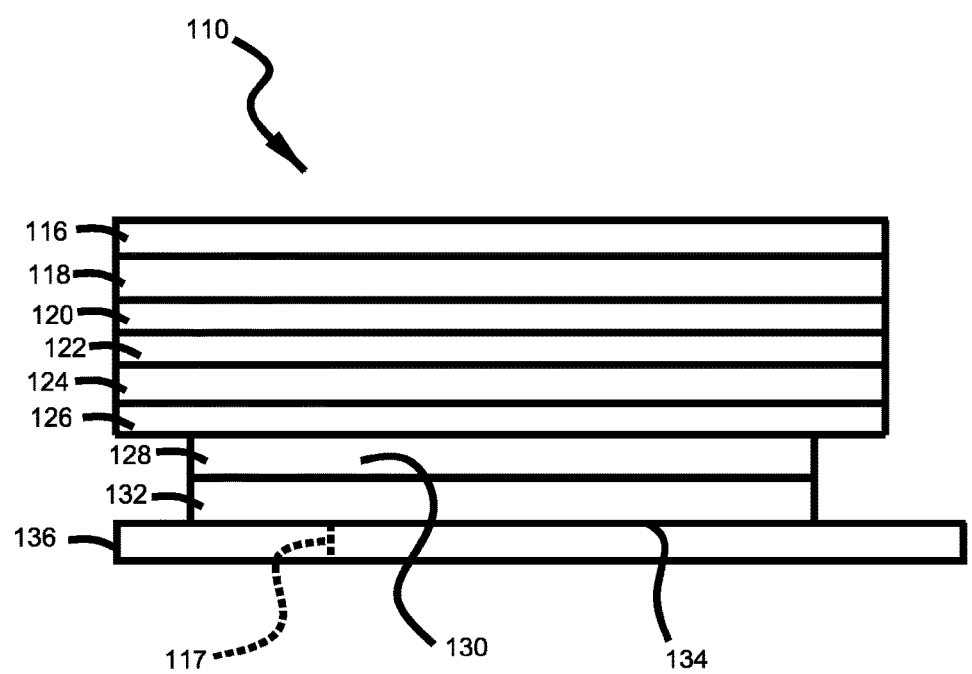
FIG. 3 is a cross sectional view of a ready to apply CID constructed in full at a manufacturing facility with a kiss cut in the carrier sheet.

FIG. 3 shows an alternative embodiment of the invention which uses a kiss cut, defined as a manufacturing process which cuts through a single layer of laminate. The layout is similar to the embodiment shown in FIGS. 1 and 2. However, instead of geometric frame 12 and adhesive layer 14 (as shown in FIG. 1) layer 136 has a kiss cut layer 312 application cut for alternative application process.

This embodiment would be printed at a commercial manufacturing facility, of CID 110. CID 110 comprises a kiss cut indentation 312 on carrier layer 136, protective substrate adhesive layer 116, adhesive layer 118, ink/dye 120, printing foundation layer 122, printed substrate layer 124, printed substrate adhesive layer 126, electronic device 128, electronic device substrate layer 130, electronic device adhesive layer 132, release substance layer 134, carrier sheet 136.

Without a geometric frame to provide some structural integrity, layer 116 and perhaps other layers would need more rigidity (e. g. paper or plastic). Perhaps adhesive layer 132 (the layer interfacing with the skin would comprise adhesive that is heat or pressure activated upon application the user's skin.

Application process: In some embodiments before application, the skin is prepped with an antibacterial solution or alcohol to cleanse the application area. The skin area can also be prepped with a material like Mastesol™ that serves as a primer for the skin increasing the bond between the skin and the adhesive layer 132. Next, a section carrier layer will be pulled off. This will expose part of adhesive layer 132. The structure of the device will be maintained by the more rigid outer rim of the device. This outer rib may also have a different adhesive to assist in the bonding around the edges of the device. Adhesive layer 132 is then pressed against the skin with reasonable force bonding. The rest of the carrier layer is removed and the remaining adhesive is bonded to the skin.

For various applications, it is desirable to CID construct suitable for customization and use the point of service meaning that the device can have additional information printed at the site of use.

The device would be partially constructed a manufacturing facility. Instead of having a protective layer over the printed layer, the printed substrate layer is exposed so that the device can be run through a printer. The printed substrate layer may comprise a material is treated to retain the ink/toner/dye so that there is no need for a protective layer. The printed substrate layer will also be treated to allow for more printed material to be applied without the need of an additional substrate. It could also be exposed to light or undergo some sort of curing process (e. g. UV) to set the ink. Alternatively, a protected layer may be added as a separate step at the facility.

In some embodiments, there may be desired a CID where there is static information preprinted at a facility. In that case, there would be a protective layer which would then serve also a printing substrate, suitable for accepting inks/toners/dyes and the like. The printed information could be protected as described above or have a second protective layer added as a separate step at the facility after POS printing.

Figure 4:
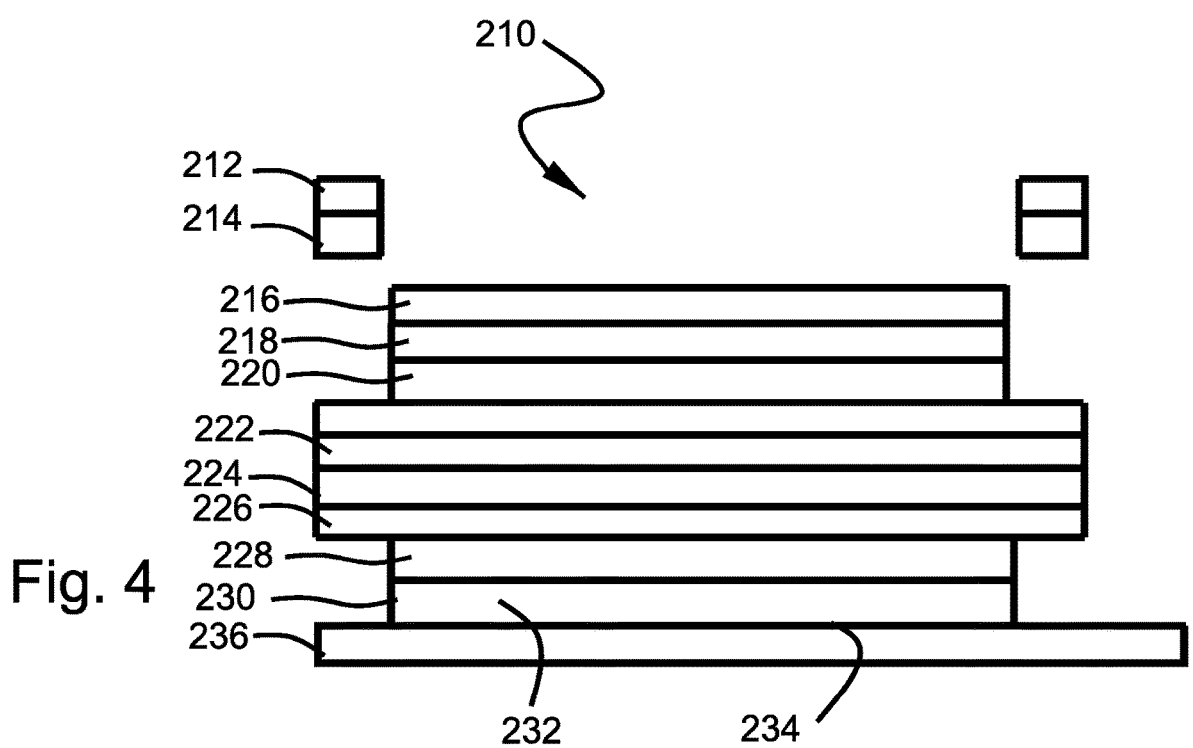
FIG. 4 is a cross sectional view of a CID constructed to allow Point of Service printing.

Referring to FIG. 4, CID 210 comprises a geometric frame 212, frame adhesive layer 214, protective substrate/POS print layer 216, protective substrate adhesive layer 218, ink/dye 220 with static information, printing foundation, layer 222, printed substrate layer 224, printed substrate adhesive layer 226, electronic device 228, electronic device substrate layer 232, electronic device adhesive layer 230, release substance layer 234, carrier sheet 236.

At the point of service, CID 210 is fed through a printer wherein ink/dye/toner is printed onto protective substrate/POS print layer 216. It may be set as described above or a second protective layer is applied as part of the printing process or as a secondary machine or manual process. An adhesive layer is optional depending on how the protective layer is applied. The second protective substrate layer protects the components of the device from external forces and the environment. In this embodiment, the protective layer would be applied as part of the printing process.

As discussed above, layer 220 may comprise visually readable data and optically scannable data. The application to skin process is the same as the embodiment shown in FIG. 1.

Figure 5:
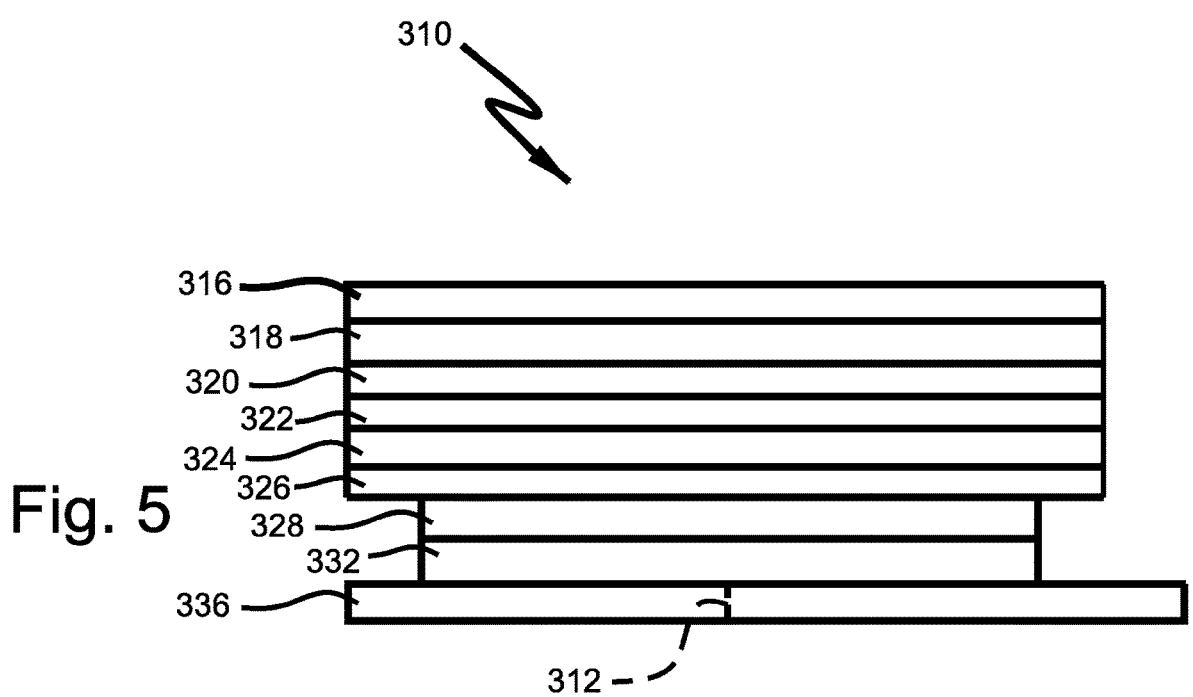
FIG. 5 is a cross sectional view of a CID constructed to allow Point of Service printing with a kiss cut in the carrier sheet.

FIG. 5 shows an alternative embodiment of the invention, which is customized at the point of service which uses a kiss cut 312. The layout is similar to the embodiment shown in FIG. 4. However, instead of geometric frame 212 and adhesive layer 214 (as shown in FIG. 4) a kiss cut 312 is used for alternative application process.

This embodiment would be printed at a commercial manufacturing facility. CID 310 comprises a kiss cut indentation 312 on protective carrier layer 336, substrate/POS layer 316, adhesive layer 318, ink/dye 320 with static information, printing foundation layer 322, printed substrate layer 324, printed substrate adhesive layer 326, electronic device 328, electronic device substrate layer 330, electronic device adhesive layer 332, release substance layer 334, and again the carrier sheet 336 with kiss cut 312.

At the point of service, CID 310 is fed through a printer wherein ink/dye/toner is printed onto protective substrate/POS print layer 316. It may be set as described above or a second protective layer is applied as part of the printing process or as a secondary machine or manual process. An adhesive layer is optional depending on how the protective layer is applied. The second protective substrate layer protects the components of the device from external forces and the environment. In this embodiment, the protective layer would be applied as part of the printing process.

As discussed above, layer 320 may comprise visually readable data and optically scannable data. The application to skin process is the same as the embodiment shown in FIG. 3. This can also consist of backgrounds logos and other static information that exists on every CID regardless of the end user.

Preprinted vs. Point of Service Manufacturing. Preprinted manufactured CID consists of variable information that is applied in a manufacturing setting. This information can be dynamic and can consist of variable images, 2d bar codes, logos and visual identifiers. These variations can signify access priorities or status such as platinum gold and silver members, age and other distinguishing features. Point of service manufacturing takes this concept another step by allowing the user to apply variable information that is gathered at the point of service. The device must be specifically designed to allow the information to be applied directly to the CID and then be immediately transferred to the user while at the same time having all the properties related to security, authentication, frangibility, functionality, durability and comfort as the fully manufactured CID.

For some applications, the devices (such those shown in FIGS. 1-3) would be delivered to the user, pre-printed manufactured commercially. For other applications, the devices would be suitable for variable printing at the point of services. All components will be skin safe and the electronics components will be treated with a functional barrier or void of harmful metals such as nickel or cobalt.

Method for Manufacturing Stand Alone CID

The manufacturing process is done reel to reel and all functions of the process are done inline to prevent waste, increase accuracy and speed of production.

The substrate layer 24 is coated with a skin safe adhesive 26 and provided in a roll format with a carrier sheet 36. The substrate layer 24 is prepped with a printing foundation laminate 22 and if the material does not intrinsically allow for printing the printed layer 20 is applied using an inline printing technique. A supportive layer which eventually becomes the frame layer 12 is placed over the entire construct. The supportive layer allows for the temporary removal of carrier layer 36 The electronic components in roll format 28,30,32 are placed on the adhesive layer 26. A carrier layer 36 is reapplied to the construct. A circular die cut, kiss cut is made in the supportive layer to start the process of turning that layer into the frame layer 12. The kiss cut is only made on the supportive layer, no other layers are affected. The first cut is a circular cut exposing the protective layer and a slit that will be used as the lip for pulling off the frame after application. A second larger circular die cut is made to create the ring used as the geometric frame 12. A final die cut is made creating the shape of the carrier sheet with a tab 36. The small circular area created by the kiss die cut is removed exposing the protective layer and printed layer and the excess material from the larger circular kiss cut is removed exposing the tab on the carrier sheet for onsite customization and finishing (Point of Service) the method is similar to except when the circular area is removed it exposes a ready to print substrate layer.

Method for Finishing Customizable CID at the Point of Service.

Point of service printing would be delivered to the user in various formats depending on the printing method. In one embodiment, the CIDs will be delivered in a roll or cut sheet format. In order for this to work, these are the considerations we made. The roll or cut sheet would be fed through a printer which would add the printed layer. The printer would be a modified 4 or 5 station printer with CMY or CMYK and a protective layer applicator as an additional 4th or 5th station.

In another embodiment, the substrate will be treated with a varnish or print layer that is durable enough to no longer make the protective layer necessary. Either direct or indirect printing is sufficient however indirect is preferred because of the reduced exposure to the substrate layer.

In a preferred embodiment, the device is delivered to the application site as a roll containing layers 316 to 336 as shown in FIG. 5. The roll is cut by the printer and fed through a printer that adds layer 5, oriented layer and layer 3 protective layer if necessary. The resulting protect is layer 3-12 single use ready to apply CID. Alternatively, the printer could print out several CID as a time if the application requires multiple devices for one individual or a family. The device can also be delivered in a cut sheet format and fed into a printer through a paper tray just like standard paper. The same modifications would be needed to allow for a protective layer.

Carrier sheet, RFID with 1 side adhesive side to go onto skin, polyurethane or flexible, perforated PET material with adhesive side abutting RFID non-adhesive side and then printer would be able to print (with toner) directly onto non-adhesive side goes through the printer and then pull off carrier sheet from RFID and stick on patient.

The printer can also be a 2, 3 or 4 station printer replacing one of the stations with a protective layer applicator.

There would be stiffer edges to maintain structure for the embodiments such as those shown in FIGS. 3 and 5 which do not have a geometric frame keeping it supported, engaged and serves as a mechanism to prevent wrinkling.

While one printing method is disclosed above, in an alternative embodiment, the paper does not have to be quarters or any set amount per page and could in any format, for example, with a roll format. In preferred embodiments, the printer is small in size, such as a hand held or clipped to the hip device. The device needs only to be large enough to print the CID, hold the necessary components for color printing.

There are multiple printing methods that may be adapted to print the CIDs at the point of service or outside of an industrial setting. Some of those methods for portable printing engine include inkjet, continuous (CIJ), drop-on-demand (DOD), thermal DOD, piezoelectric DOD, Offset printing, Rotogravure, Flexography, Letterpress printing, Screen-printing, Electrophotography, Transfer-print, SOHO inkjet photo printing, Fine Art Inkjet Printing, Memjet, Edgeline Primera and Waterjet among others. In applications where the identification is meant to expire the CID can be generated with this type of printing technology where the ink will fade by design rendering it unreadable.

Laser Printing as defined in other patent applications electrostatic digital printing process. Laser has many advantages including the ability to print in white and anti-counterfeiting technology to name a few. Similarly, the Tonejet process is an electrostatic drop-on-demand deposition technology that enables high-quality images to be printed onto virtually any type of absorbing or non-absorbing substrate at high speed. Any one of these systems can utilize a contiguous ink system if configured in a stationary setup.

Dye-Sublimation Printing uses heat to adhere the ink to the substrate by releasing the ink from a ribbon. Dye-Sublimation printers also have an overcoat as well, which can further protect the image being created.

In an alternative embodiment, the last clear layer would be replaced with an adhesive layer making this layer the one that comes in contact with the skin. This adhesive can be pressure sensitive, activated by a solvent, water, UV light, heat or any other method of adhesive activation. As mentioned above, in an alternative embodiment the adhesive particles will be included in the formulation of the pigment, toner, dye or ink. Therefore, there will be no need to add an additional adhesive layer and these adhesive particles which will bond the CID to the surface of the skin can be activated with a solvent, water, UV light, pressure, heat or any other adhesive activation process.

In an alternative embodiment, the present invention to provide a CID (cutaneous identification or information device) with a white (or other solid color) background, colored contrasting background and clear third outer layer which is the layer that will come in contact to the skin when applied.

In another embodiment, one of the cartridges in the printer will contain metallic or conductive ink that can be used to print the antenna of an RFID device, UHF or NFC, radio or any other section of a circuit where metallic materials are necessary. With the metallic cartridge, a ready-made CID can be generated from a printer with a workable RFID antenna or any other form of noncontact communication requiring a circuit with metallic materials. In a preferred embodiment, the RFID antenna or the like printed in the printer will also be MRI compatible. In an alternative embodiment as described in previous disclosures, RFID devices will be included in the construct. These RFID devices will be printed using a metallic or conductive ink printer, rolled on using a pressure roller or can be found in the formulation of the dyes. In this process one cartridge in the printer will include metallic inks. These metallic inks can be used essentially print the antennas as part of the CID construct.

These metallic inks could also be MRI compatible Non-ferromagnetic metals such as titanium, cobalt-chromium alloys, stainless steel, aluminum, brass, copper, and many others. Silver, copper and many other materials also have metallic particles which are known to have antibacterial and anti-microbial properties. These metallic particles can also be included in the dye to create these anti-microbial and anti-bacterial properties with the CID.

In an alternative embodiment, the printer could apply inks or other materials or substances to the CID to be used in connection with Laser, IR, UV light or any electromagnetic technology. Bioluminescent ink (light emitting from organic material), inks to print an OLED organic light-emitting diode (OLED) and other such materials can be used to interact with the device in any number of environments to enhance the capability or effectiveness of the product and also be used as a method of applying the device to an individual.

An alternative embodiment of the invention would include using a perforated barrier sheet that would make more like a sticker, less like a tattoo and cause it to break apart when the structure is removed or attempted to be removed making the CID impossible to transfer. Sheet 10 could be in the form of a carrier sheet with adhesive and an extremely thin substrate and that device is printed on directly then peeled and apple to the skin directly and white so that when it is transferred like a sticker the white layer is already present and does not need to be applied by the printer. This embodiment would be good in situations or scenarios where frangibility or enhanced security is not as important. Possible materials for use include double layer 3M Breathable Polyurethane Tape, and the Vancive perforated PET as will be described. In preferred embodiments, the carrier sheet comprises a breathable material or is perforated to increase breathability.

This particular tape is well suited for skin application since it is breathable yet provides a liquid barrier and the hypoallergenic acrylate adhesive provides for excellent "quick stick" to skin or other surfaces. Another alternative is polyurethane materials like TEGADERM which is a transparent medical dressing also manufactured by 3M. Tegaderm transparent dressing is typically used to cover and protect wounds and catheter sites. Advantages of Tegaderm include its biocompatibility, breathability and conformation to a non-flat surface.

In a preferred embodiment, the substrate from will be a specifically designed layer that is frangible, serves as functional barrier yet is durable enough to withstand the printing process.

Turning to FIGS. 6-9, an alternative embodiment believed to be particularly advantageous from the standpoint of manufacturing economy and improved frangibility is schematically illustrated. As in the other figures herein, thicknesses are greatly exaggerated for clarity of illustration of the various component layers. In practice, the inventive CID may be, for example, three quarters of an inch in diameter and have an overall thickness similar to that of a conventional paper sticker.

More particularly, CID 410 takes advantage of the ability of polyethylene terephthalate, commonly referred to as PET or PETE, to receive and durably retain inks and other colored printing materials. At the same time, PET has the advantage, in the context of skin applied devices, of being safe, non-toxic, strong, lightweight and flexible. Indeed, PET is the material of choice for the fabrication of plastic water bottles. Perhaps more importantly, PET is also commonly used as an outside protected layer in at least some types of RFID electronic constructions.

The construction of CID's typically contemplates the use of specialized substrate layers for receiving ink, such as print receiving substrate layer 124 and substrate adhesive layer 126 in the embodiment of FIG. 3. However, in accordance with the invention, it has been recognized that specialized manufacturing techniques associated with the commercialized manufacture of CID's may be greatly simplified by eliminating the need to develop a fabrication technique further complicated by the provision of a print receiving substrate layer and substrate adhesive layer. At the same time, there is also no need to develop a specialized RFID construction technique to the extent that the PET protective layer, about which current RFID construction is centered in at least some types of devices, will function well as a dedicated print receiving layer in a CID.

Figure 6:
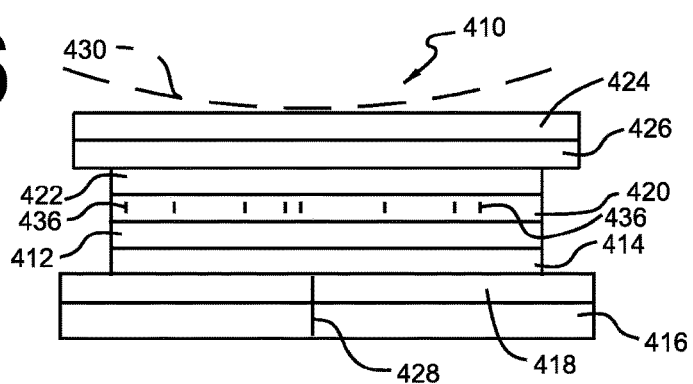
FIG. 6 is a schematic illustration of a cross sectional view of an alternative embodiment of a CID.

The structure of FIG. 6 takes advantage of the ink receiving characteristics of PET to provide an RFID enhanced CID while, at the same time, eliminating the prior art need of complicating the manufacturing process by the addition of process steps providing for print receiving substrate and substrate adhesive layers. The cost of these process steps is not an insubstantial part of the overall manufacturing costs. Accordingly, the structure of FIG. 6 is believed to be of particular advantage to the objective of providing cost-effective and reliable CID devices.

As alluded to above, CID 410 includes an RFID componentry (for example electrical and/or electronic componentry) layer 412 which is secured by an adhesive 414 to a carrier sheet base 416. Carrier sheet base 416 may be made of a relatively stiff material, such as paper in order to give the CID form and shape allowing easy handling of the same during application to the human skin. Separation of carrier sheet base 416 from adhesive layer 414 is facilitated, during application of the CID 410 as is described more fully below, by a layer of release material which may be plastic, wax or the like. Adhesive layer 414 may be composed of any one of a number of adhesives typically used in self-adhesive structures such as stickers, tape, and so forth. Carrier sheet 416 is slightly larger than the other components of the CID to provide for protection from damage and ease of handling.

RFID electronics layer 412 is protected by PET layer 420. In accordance with the invention, it is contemplated that PET layer 420 is constructed to break apart upon the application of relatively small forces, thus providing for frangibility. Frangibility promotes the security of the overall system associated with the CID 410 of the present invention. Such frangibility may be provided by perforations 436 in PET layer 420 which cause PET layer 420 to break apart when subjected to tension, for example when PET layer 420 is pulled from the skin.

More particularly, it is contemplated that the force needed to separate adhesive layer 414 from the skin of the individual identified by CID 410 will be greater than the force needed to break apart the PET layer and associated RFID componentry 412, for example at the perforations 436, which are described below. In accordance with a preferred embodiment, the force needed to separate adhesive layer 414 from the skin of the individual identified by CID 410 will be substantially greater than the force needed to break apart the PET layer and associated RFID componentry 412.

Similarly, the RFID inlay will shear under the same tensions. In accordance with one variation of the FIGS. 6-9 embodiment, the RFID component is put under these tensions the perforations in the protective layer 436 will put the RFID under greater pressure. This pressure will cause the RFID to be damaged. The damage can render the device incapable of performing its original function. This tamper resistance function would allow facilities to distinguish between users which have functioning devices or users of a device which has been tampered with at some point. Perforations 436 may be uniformly spaced. Alternatively, perforations 436 may be positioned to coincide with more fragile portions (or purposely weakened portions) of the RFID electronics to promote frangibility of CID 410.

Other possible methods of introducing frangibility into the device include the removing PET layer of the RFID. In an alternative embodiment, instead of using PET to support the inlay, the design would include a small enough window to keep strength. Instead of a no material, there would be a thin layer of adhesive with structural stability provided by carrier sheet to the surface of the skin. In an alternative embodiment instead of removing the PET layer form the RFID it is perforated to allow for breathability and frangibility. The circuit itself may be designed to be less durable at high temperatures and in some embodiments, the circuit may be printed right on the polyurethane.

As alluded to above, in the event of CID may be printed, at the factory where it is fabricated, with various types of information, such as the name of a resort, the name of a hospital, gold or platinum privilege indications, and so forth. In addition, certain areas may be left unprinted to allow customization at the point of application. Information may be printed, both in the manufacturing factory or at the point of application to the user by using an appropriate ink, toner or the like to form a printed layer 422.

Optionally, a protective layer 424 may be adhered to the CID by adhesive layer 426 of relatively nonaggressive adhesive to facilitate easy removal of optional protective layer 424. Protective layer 424 may be slightly longer (for example long enough to be gripped by a fingernail) than the layers it overlies to provide for ease of removal.

During use, carrier sheet 416 must be removed from CID 410. The same is facilitated by a kiss cut 428, for example across the middle of carrier sheet 416.

When it is desired to use the inventive CID 410, the RFID electronics is scanned and the number associated in the computer system of the facility using the CID as an identifier with the name and record of the person to whom the CID is being applied. CID 410 is then flexed into a curved shape resembling line 430 in FIG. 6.

Figure 7:
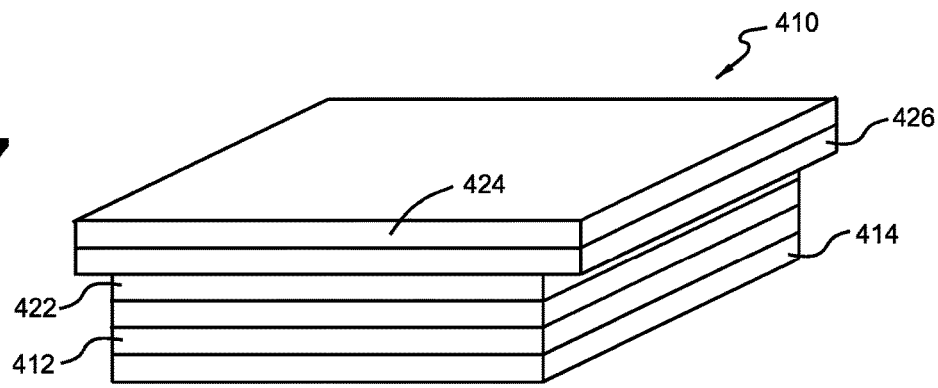
FIG. 7 is a view of the CID shown in FIG. 6 on its carrier.

This results in separation of carrier sheet 416 into its two component parts at kiss cut 428, allowing carrier sheet 416 to be peeled away by hand in the manner of a conventional sticker, leaving behind the structure illustrated in FIG. 7. As illustrated in FIG. 7, adhesive layer 414 is thus exposed.

Figure 8:
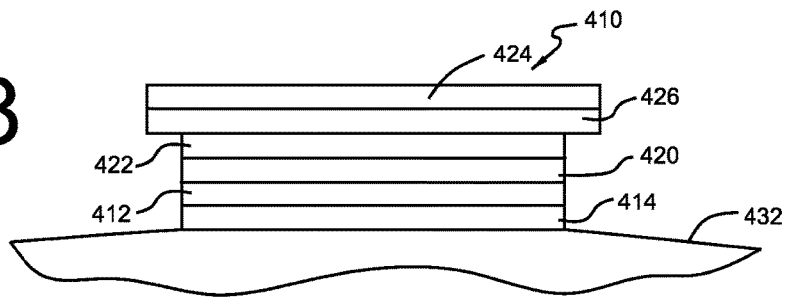
FIG. 8 is a cross sectional view of the CID shown in FIG. 6 removed from its carrier and ready to apply to the wearer.

CID 410, after removal of carrier 416 and its associated release layer 418 may then be adhered to the skin 432 of the user as illustrated in FIG. 8.

Figure 9:
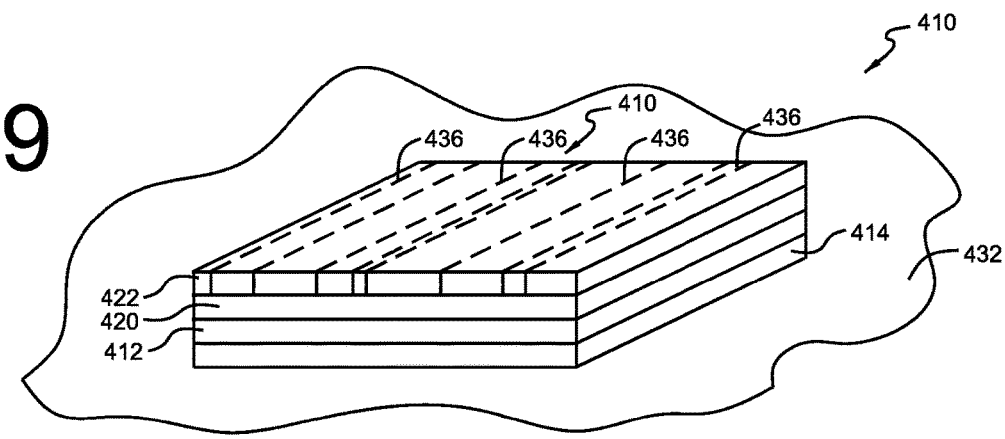
FIG. 9 is a top view of the CID shown in FIG. 8 applied to the wearer.

Optional protective layer 424 and its associated adhesive layer 426, if they were included in the structure, would then be removed, leaving behind the operative parts of the inventive CID in place, as illustrated in FIG. 9.

In connection with the embodiment of FIGS. 6-9, it is noted that while a kiss cut structure has been illustrated, it would also be practical to provide for a frame structure in the manner of the previously described embodiment. In preferred embodiments, the user can see a logo.

In an alternative embodiment, the dye or pigments will contain particular materials for authentication and security, including but not limited to nano-sized RFID chips, fluorescents and UV activated inks.

In an alternative embodiment, the printer could apply inks or other materials or substances to the CID to be used in connection with Laser, IR, UV light or any electromagnetic technology. Bioluminescent ink (light emitting from organic material), inks to print an OLED organic light-emitting diode (OLED) and other such materials can be used to interact with the device in any number of environments to enhance the capability or effectiveness of the product and also be used as a method of applying the device to an individual.

An alternative embodiment of the invention would have the tattoo function and include using a perforated barrier sheet which will serve as the substrate on which the CID construct will be built. In this embodiment, the CID would be printed with a mirror image since the entire construct will be removed from the release paper and applied directly to the skin as opposed to flipping the construct and using a release agent. Whether the device is more like a tattoo, a sticker, or a hybrid version as shown in FIGS. 16-21, in preferred embodiments, a customizable QR code is tied to the device. For healthcare uses, the QR code is linked to a Patient Identification Record for healthcare field or to a hyperlink such as the hyperlink to the Patient Portal. For recreational uses, the Printing of QR code concerts, VIP events, hospitality, etc. linking via a smartphone app by using the smartphone to scan the QR code.

Turning to FIGS. 10-15, an alternative embodiment believed to be particularly advantageous from the standpoint of manufacturing economy and improved frangibility is schematically illustrated. As in the other figures herein, thicknesses are greatly exaggerated for clarity of illustration of the various component layers. In practice, the inventive CID may be, for example, an inch in diameter. In a preferred embodiment, the device will have curved edges such as round or oval. Curved edges adhere to the skin more effectively and have less chance of curling edges and the bond to the skin more likely to remain intact.

Figure 10:
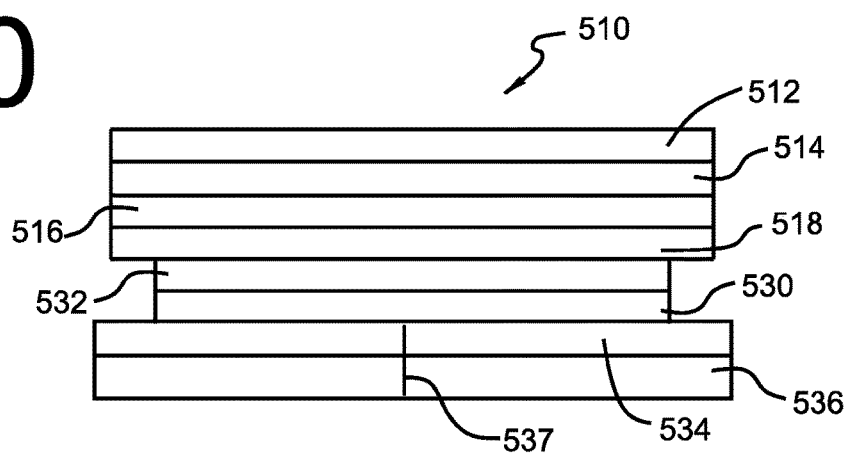
FIG. 10 is a is a schematic illustration of a cross sectional view of an alternative embodiment of a point of service printable CID.

Instead of a separate print receiving substrate layer 124 and substrate adhesive layer 126 in the embodiment of FIG. 3 or printing on PET layer 420 as shown in FIG. 6, the printing is done on the outer facing side of the top layer while the underside of the top layer includes an adhesive to interface with the electronics layer. This streamlined design eliminates the prior art need of complicating the manufacturing process by the addition of process steps providing for print receiving substrate and substrate adhesive layers. Materials well suited for the device based on their properties, print acceptance capability, breathability and durability are perforated PET, which allows specifically allows for printing and breathability, and Polyurethane, which is flexible and breathable and can be printed on. Specifically, the use of a white, off-white or the like, substrate has advantages in environments where the readability of the print is extremely important. This design is more particularly suited to be printed Point of Service, thus allowing for further customization. Thus, the structure of FIG. 10 is believed to be of particular advantage to the objective of providing cost-effective, reliable, and customizable CID devices.

CID 510 comprises a frame layer 512 which could be a separate sheet or a geometric carrier frame as described above and can be but does not have to the same width as the layer 516-530, frame adhesive release layer 514 allowing for easy removal of frame layer 512, print layer 516, adhesive layer 518, electronic device component 532 comprising any electronic components and which may or may not include a support layer, electronic device adhesive layer 530, release substance layer 534, carrier sheet 536 which includes kiss cut 537. Print layer 516 may be fully or partially preprinted at the factory. When used at the point of service for on-site customization, CID 510 is fed through a printer wherein ink/dye/toner is printed onto print layer 516. More particularly print layer 516 would be elastic, flexible to be comfortable for the wearer. Furthermore, as skin moves, the edges would preferable be flexible to stay adhered to the skin.

In one embodiment, the adhesive layer 518 may comprise a nonaggressive, weaker adhesive layer print layer 516 could be removed while leaving electronics device 528 intact adhered to the skin 538. Electronics device component 532 includes any electronics and electronic device support, while electronic device adhesive layer 530 preferably comprises stronger adhesive layer.

Optionally, a protective layer (not shown) may be adhered to the CID by an adhesive layer of relatively nonaggressive adhesive to facilitate easy removal of optional protective layer. It may be set as described above or a second protective layer is applied as part of the printing process or as a secondary machine or manual process. An adhesive layer is optional depending on how the protective layer is applied. The protective substrate layer protects the components of the device from external forces and the environment. In another embodiment, the ink may a thermal or pressure ink which can be printed through the protective layer onto the print layer 516.

Frame layer 512 may be made of a relatively stiff material, such as paper in order to give the CID form and shape allowing easy handling of the same during application to the human skin. Separation of carrier sheet 536 from adhesive layer 530 is facilitated, during application of the CID 510 as has been described, by a layer of release material 534 which may be plastic, wax or the like. Adhesive layer 530 may be composed of any one of a number of adhesives typically used in self-adhesive structures such as acrylics, pressure sensitivities and silicone to name a few.

In one embodiment, the carrier sheet 536 is slightly larger than the other components of the CID to provide for protection from damage and ease of handling.

As alluded to above, in the event of CID may be printed, at the factory where it is fabricated, with various types of information, such as the name of a resort, logos, the name of a hospital, gold or platinum privilege indications, and so forth. In addition, certain areas may be left unprinted to allow customization at the point of application. Information may be printed, both in the manufacturing factory or at the point of application to the user by using an appropriate ink, toner or the like to print on layer 516.

During use, carrier sheet must be removed from CID 510. To facilitate this removal a kiss cut can be applied to the carrier sheet 536 for example across the middle of carrier sheet. The kiss cut does not have to go across the entire carrier frame. In one embodiment, the carrier sheet is the same shape as the rest of the device with a kiss cut across a portion of the carrier sheet, sufficient enough to grab the edge but still in a single unit that can be removed with a single pull. This would allow the carrier sheet to be removed as a single piece and eliminate the need to remove each half of the carrier sheet individually.

Figure 11:
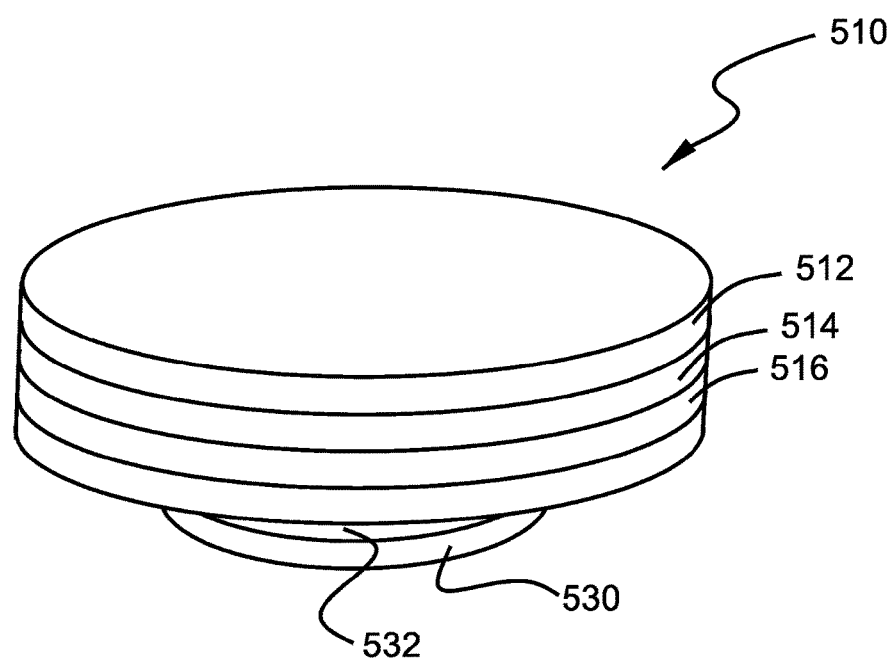
FIG. 11 is a view of the CID shown in FIG. 10 on its carrier.

When it is desired to use the inventive CID 510, the carrier sheet is separated from the device and allowing carrier sheet 536 to be peeled away by hand in the manner of a conventional sticker, leaving behind the structure illustrated in FIG. 11. Once separated the electronics are scanned and the number associated in the computer system of the facility using the CID as an identifier with the name and record of the person to whom the CID is being applied, these two components, the individual and the CID are then linked in the system. As illustrated in FIG. 11, adhesive layer 530 is thus exposed. CID 510, after removal of carrier 536 and its associated release layer 534 may then be adhered to the skin as shown in FIG. 12 layer 538.

Figure 12:
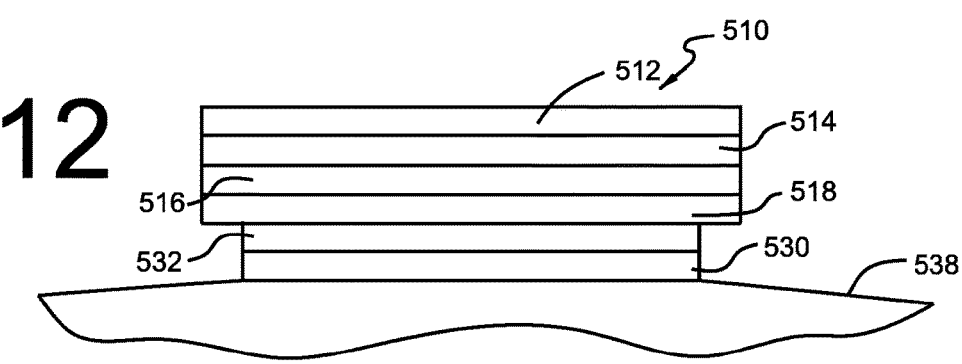
FIG. 12 is a cross sectional view of the CID shown in FIG. 10 removed from its carrier and ready to apply to the wearer.

Optional protective layer and its associated adhesive layer, not shown, if they were included in the structure, would then be removed, leaving behind the operative parts of the inventive CID in place, as illustrated in FIG. 12. As Device 510 is applied directly to the surface of the skin layer 538. When it is applied the device can perform a variety of functions related to the visual and electronic capability of the components. For example, electronic component inlay, electronic component inlay can have other electronic sensors, perhaps UHF OR NFC enabled and other components that enhance functionality. Once applied to the skin the device can use sensors to measure various types of biometric data including heart rate monitor, body temperature, glucose, EKG, analyze sweat composition, and various other biometric capabilities. The removal of the CID from the skin can include the entire structure including the electronic components. Thereby leaving nothing on the skin. The potential to add in other functionality to a CID, is quite advantageous. For example, by measuring delta of core temp and hydration monitor, there can be a quick alert sent to the central monitoring location to alert someone for signs of heat exhaustion or hypothermia. Additionally, functionality can be added to measure outside factors such as UV Exposure, air quality, outside temperature, or in military applications exposure to harmful chemical agents. In a recreational capacity, this is particularly useful during walking and hiking trips and particularly useful for using with younger persons such as Scouts or young athletes, where they don't easily realize the danger signs of heat exhaustion or hypothermia during activities. When the identification device is non-transferable, there will never be an issue of mistaken identity, so for wearers who are already vulnerable in these circumstances, monitoring is especially useful.

Alternatively, for added frangibility and non-transferability, when the CID is removed the adhesion between the 538 and the adhesive layer 530 is stronger that the adhesion between the electronic layer 532 and the adhesive on the protective layer, such that when the device is removed the electronic components remain on the skin. Once removed the electronic components will be printed with a new design so that when the Protective layer is removed a secondary visual design is displayed for the user. In one embodiment, the device will have no substrates. The printing layer will be applied directly to the adhesive. This structure will not be able to be removed in a single piece. Furthermore, the electronic components can also be removed and replaced with micro-electronics nano technology embedded into the inks and adhesive formulation.

For added security, frangibility can be added to prevent the device from being left intact so that when the device is removed from the surface of the skin it ceases to function. This can be done by the existence of a weak point over the main circuitry of the electronics. Electronics typically sit on a substrate later that gives form and function. The designated weak spots may be added with dents, perforations, gap(s), thinner layers, different material into the base that holds the RFID antenna or a portion of the electronic components. Therefore when the device is removed key components electronics are exposed and damaged during the process.

Figure 13:
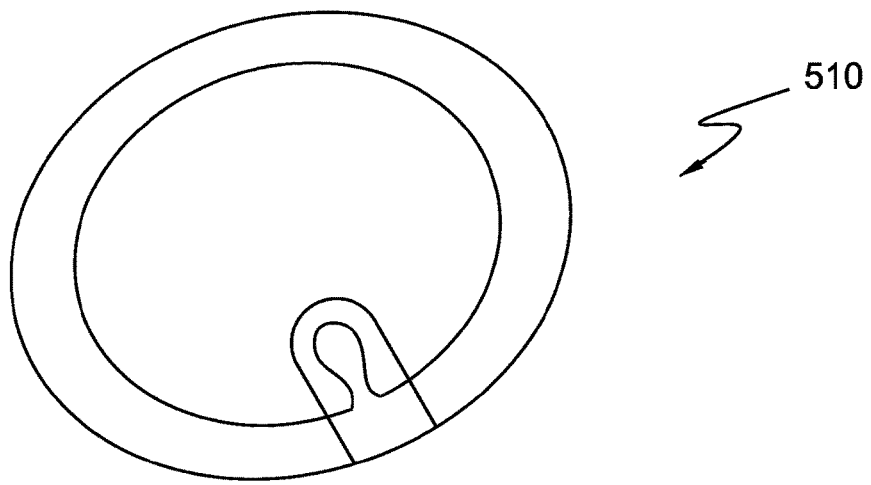
FIG. 13 is a top view of a specific embodiment of FIG. 10 with frangibility built into the electronics support layer.
Figure 14:
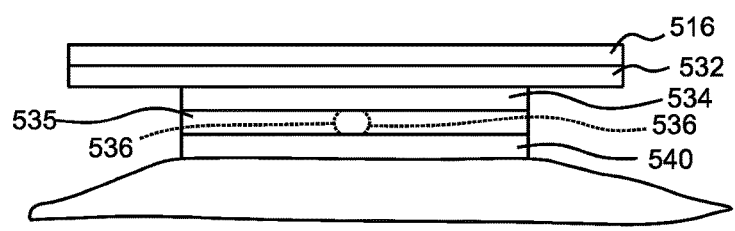
FIG. 14 is a cross sectional view of the embodiment of FIG. 13 on the wearer's skin.
Figure 15:
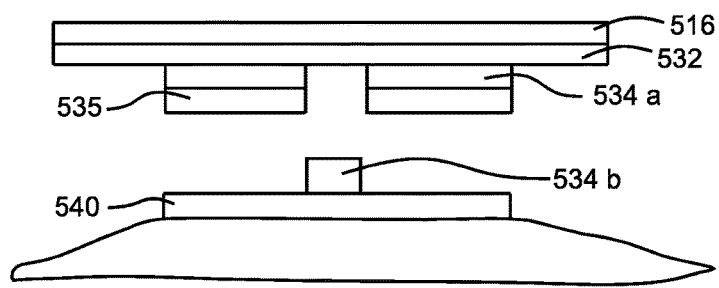
FIG. 15 is a cross sectional view of the embodiment of FIG. 13 removed from the wearer's skin.
Figure 16:
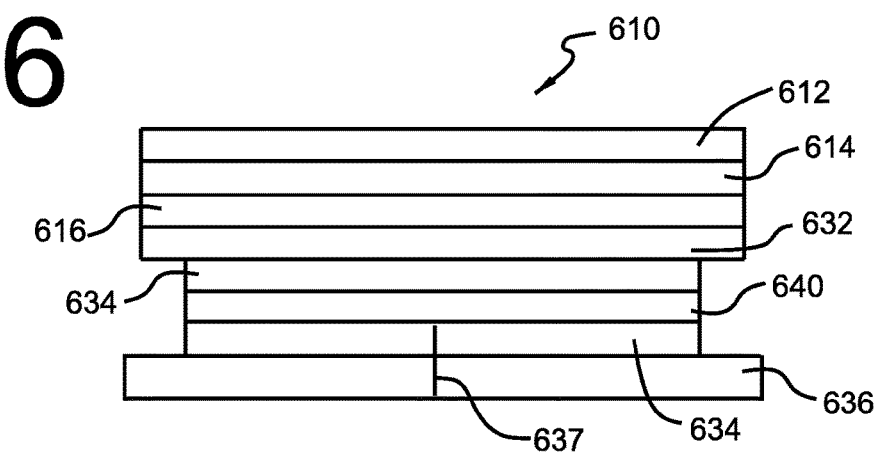
FIG. 16 is a cross sectional view of an alternative embodiment of a partially customizable at point of service CID on its carrier.
Figure 17:
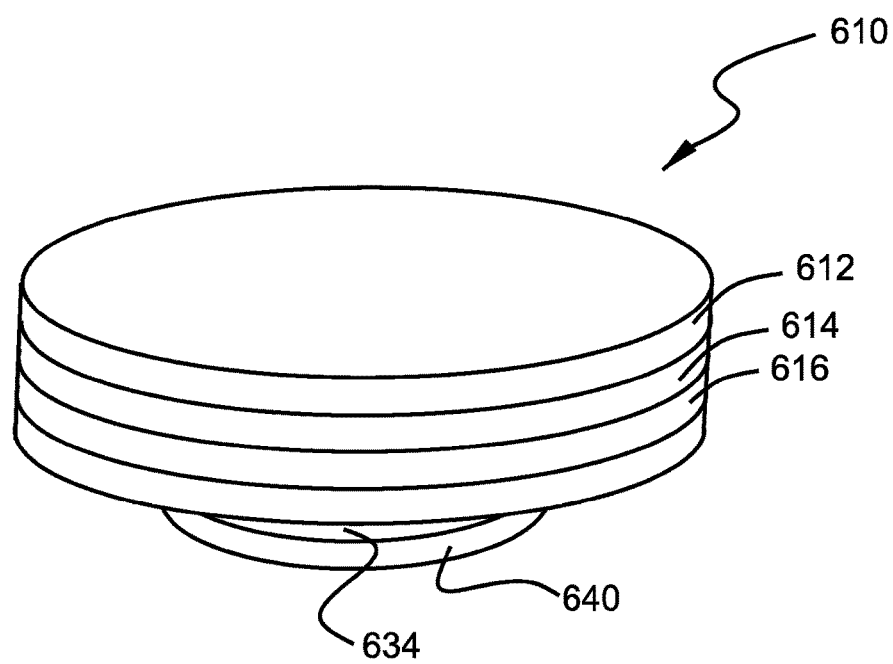
FIG. 17 is a view of the CID shown in FIG. 17 on its 1 removed from its carrier and ready to apply to the wearer.

In certain embodiments, the substrate layer will not exist in a particular area so that when the device is removed the circuit is broken and the device no longer functions. The substrate layer can also be perforated serving the same function. Bond between skin and electronics is stronger than the bond between the electronics support layer and the electronics. Thus, the electronics cannot be transferred as the electronics are too fragile to exist without the support layer. FIGS. 13-15 show an alternative embodiment where the electronics support layer 532, sits include a built in weak point 535, which could be a perforation, extra cut so that during removal, adhesive 530 causes a break in electronics substrate 533 rendering inoperable its support function. Thus, electronics 528 cannot be transferred because without electronics substrate 533, electronics 528 are too fragile.

An alternative method of adding frangibility to device has adhesive 530 interwoven into layers of the electronic components layer 532 where there are gaps or spacing between the inlay for the electronics and adhesive. Thus, adding built in weakness into the structure so that when removed, it pulls apart/breaks apart the electronics components structure 532 including its antenna. In some embodiments, body temperature would cause adhesive to disintegrate over time. In an alternative embodiment, the adhesive would disintegrate with an elevated body temperature, thus providing an alert that someone is miming a fever and needs medical attention.

Other possible methods of introducing frangibility into the device include the removing polyurethane underneath the antenna which is in the support layer of the electronics. In another embodiment, all substrates are removed leaving only frangible components where the skin is the support layer and device cannot be removed in a single piece. In some embodiments, the stress necessary to pull top layer off exceeds strength of the electronic components so functionality is maintained until removed from skin. In some embodiments, a gap is built into the electronics component either the support or the antenna, but with a small enough window to keep strength so that the components are exposed, unsupported and easily broken during removal. In certain embodiments, there would be perforations covering up to 98% of the material to enhance both breathability and frangibility. Perforations can also be placed through the antenna structure, placed in an area through the vertical layers. In certain embodiments, these perforations can be found in the substrate that supports the electronics if the substrate is present.

In an alternative embodiment, instead of using PET over inlay, the design would include a small enough window to keep strength. Instead of a no material, there would be a thin layer of adhesive with structural stability. In an alternative embodiment, instead of using PET over inlay, the design would include a small enough window to keep strength. Instead of a no material, there would be a thin layer of adhesive with structural stability provided by carrier sheet to the surface of the skin. In an alternative embodiment, the printed layer is on a substrate that is a grouping of particles, like tiny pieces of paper that are not held together in anyway outside of the adhesive layer the particles sit on. In another embodiment, the portions of the electronic device naturally deteriorate over time. These components render the device inoperable after its useful life, which is shorter than the rest of the components.

Turning to FIGS. 16-21, an alternative embodiment is shown where the identification device has the added functionality of leaving a temporary tattoo behind after removal or separation of the printed layer. This hybrid believed to be particularly advantageous from the standpoint of adding short term and long-term functionality into one device. As in the other figures herein, thicknesses are greatly exaggerated for clarity of illustration of the various component layers. In practice, the inventive CID may be, for example, one inch in diameter.

This device is a hybrid CID in which the device is applied to the surface of the skin. The device would function in all ways consistent with a CID visually and electronically, similar to the embodiments shown above. In this embodiment, a gap in the electronics or around the electronics a combination of pigment and adhesive are applied directly to the surface of the skin. This adhesion is not impeded in any way by the electronics. When the top part of the device is removed the pigment and adhesive remains, forming a layer of pigment and ink with visually perceptible information, design or optical codes, for example, QR, barcode or Datamatrix. There is no bond between the upper layer, preferably comprised of polyurethane and this pigment and adhesive section. Because if this then removed the device does not pull on this section and it remains intact on the skin even after the device is removed.

Similar to the embodiment in FIGS. 10-12, CID 610 comprises a frame layer 612 which could be a separate sheet or a geometric carrier frame as described above, frame adhesive release layer 614 allowing for easy removal of frame layer 612, print layer 616, adhesive layer 618, electronic device component 632 comprising any electronic components and which may or may not include a support layer. However instead of an electronic device adhesive layer abutting release substance layer 634, temporary tattoo 640 would abut release substance layer 634 on top of carrier sheet 636. In other words, electronics 632 would be held in place print layer 616 and adhesive layer 618. In preferred embodiments, specifically, printed layer 616 comprises pigment on printable substrate. Adhesive layer 618 may comprise pressure sensitive adhesives, acrylics activated with water or adhesive, silicone, other suitable adhesives for skin application. Optional release agent 634 is preferable. Persistent tattoo layer 640 comprises a combination of ink and adhesive arranged in a mirror image to provide a physiologically perceptible and humanly understandable information when the same is applied on skin. Print layer 616 may be fully or partially preprinted at the factory similar to the embodiments discussed above. However, it is anticipated that pigment and ink tattoo layer 640 would be pre-printed at the factory.

When used at the point of service for on-site customization, CID 610 is fed through a printer wherein ink/dye/toner is printed onto print layer 616. More particularly print layer 616 would be elastic, flexible to be comfortable for the wearer. Furthermore, as skin moves, the edges would preferable be flexible to stay adhered to the skin. Similar to the embodiments above, an optional protective layer (not shown) may be adhered to the CID by adhesive layer of relatively nonaggressive adhesive to facilitate easy removal of optional protective layer. It may be set as described above or a second protective layer is applied as part of the printing process or as a secondary machine or manual process. Similar to the embodiments above, frame layer 612 may be made of a relatively stiff material, such as paper in order to give the CID form and shape allowing easy handling of the same during application to the human skin. Separation of carrier sheet 636 from adhesive layer 630 is facilitated, during application of the CID 610 as has been described, by a layer of release material 634 which may be plastic, wax or the like. Adhesive layer 630 may be composed of any one of a number of adhesives typically used in self-adhesive structures such as stickers, tape, and so forth. Carrier sheet 636 is slightly larger than the other components of the CID to provide for protection from damage and ease of handling. Protective layer Adhesive (e.g. pressure sensitive adhesive)—could be deactivated by time, water, alcohol or other solution. The outer layers are preferably elastic and flexible for to be comfortable on the skin of the wearer as the skin move. Furthermore, the edges need to be flexible to stick on the skin.

As alluded to above, in the event of CID may be printed, at the factory where it is fabricated, with various types of information, such as the name of a resort, the name of a hospital, gold or platinum privilege indications, and so forth. In addition, certain areas may be left unprinted to allow customization at the point of application. Information may be printed, both in the manufacturing factory or at the point of application to the user by using an appropriate ink, toner or the like to form printed layer 616.

Figure 18:
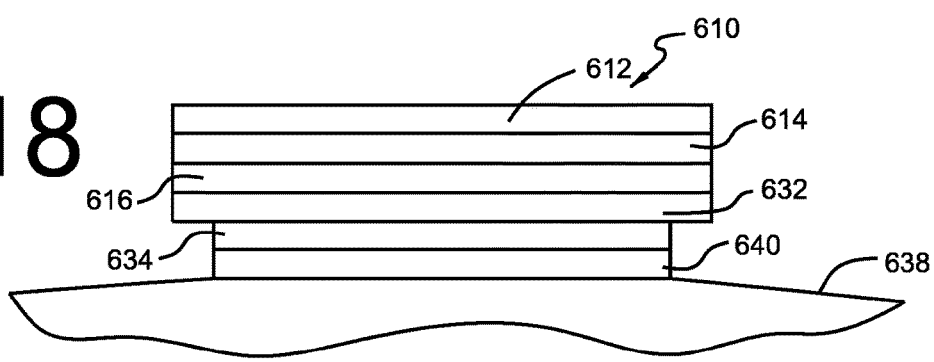
FIG. 18 is a cross sectional view of the CID shown in FIG. 17 applied to the wearer.
Figure 19A:
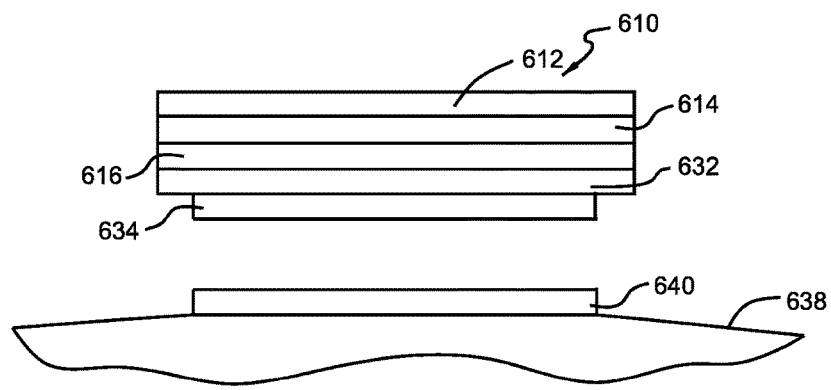
FIGS. 19a-19c are cross sectional views of the CID partially removed from the skin of the wearer.
Figure 19B:
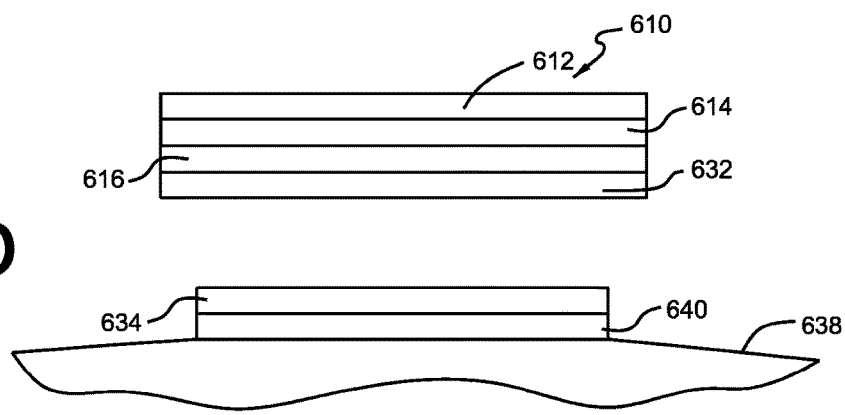
Figure 19C:
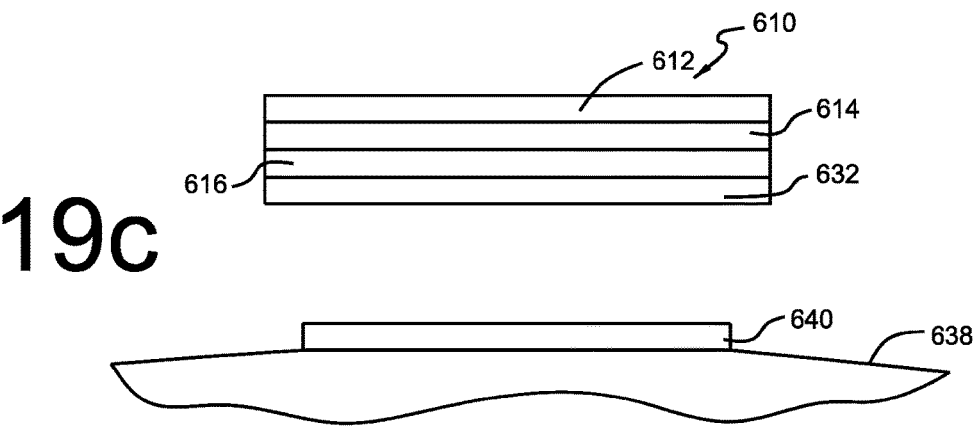
Figure 20:
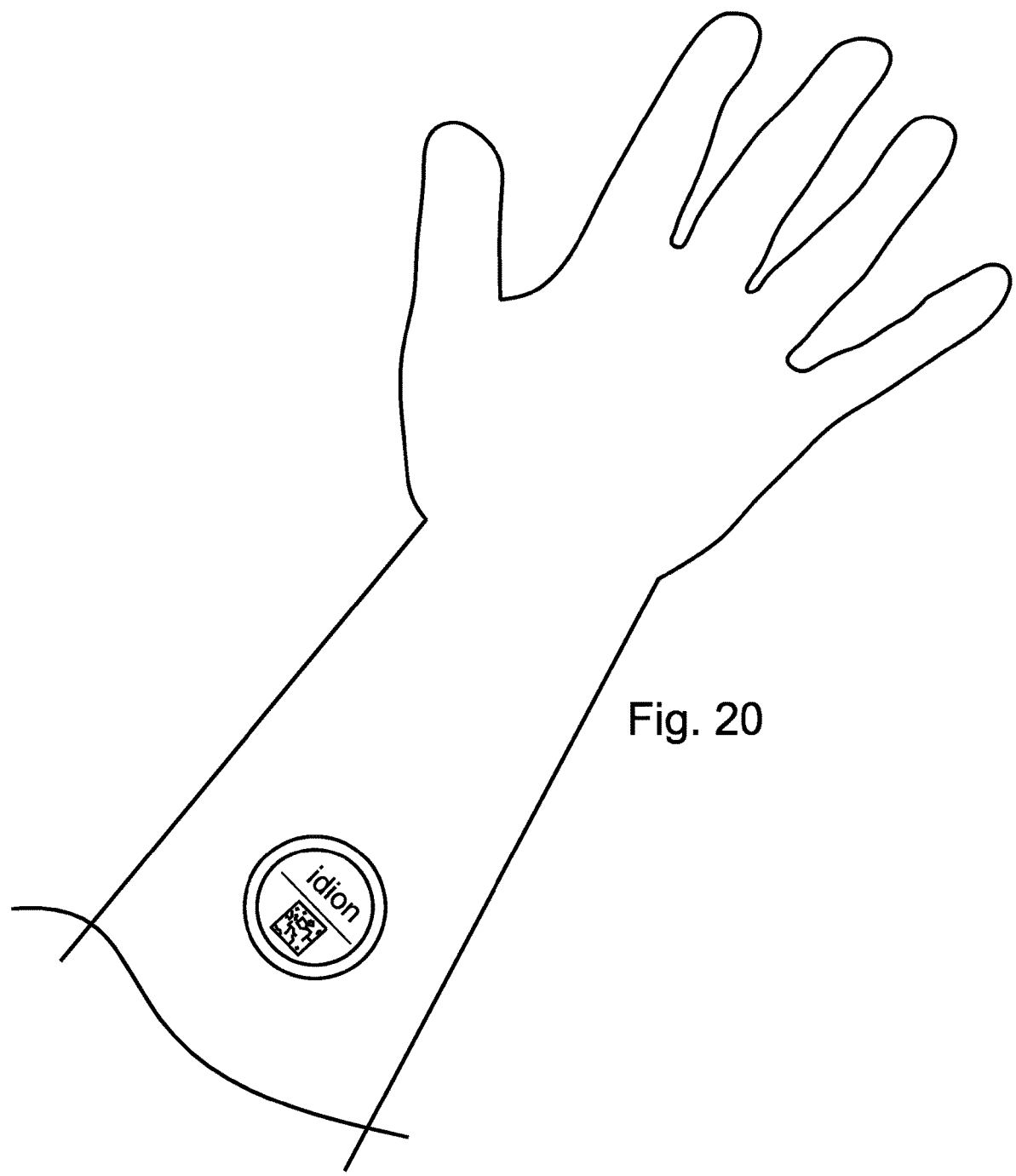
FIG. 20 shows a top view the CID on the wearer.
Figure 21:
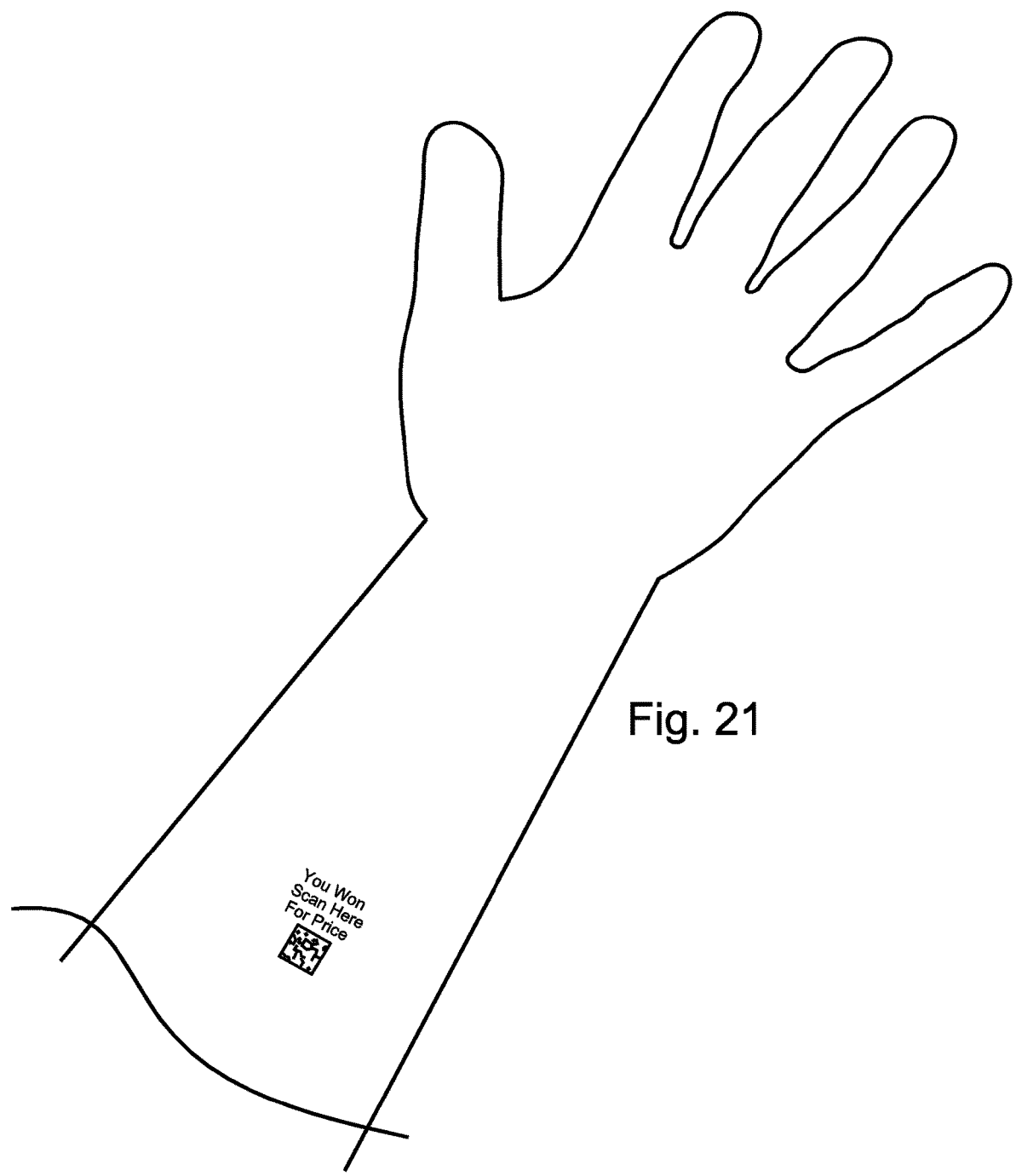
FIG. 21 shows a top view of the CID partially removed from the wearer.

During use, carrier sheet 636 must be removed from CID 610. The same is facilitated by a kiss cut 637, for example across the middle of carrier sheet 636. When it is desired to use the inventive CID 610, the electronic component is scanned and the number associated in the computer system of the facility using the CID as an identifier with the name and record of the person to whom the CID is being applied. Separating the carrier sheet and allowing carrier sheet 636 to be peeled away by hand in the manner of a conventional sticker, leaving behind the structure illustrated in FIG. 17 where adhesive layer 618 and tattoo layer 640 is exposed. CID 610, after removal of carrier 636 and its associated release layer 634 may then be adhered to the skin 638 of the user as illustrated in FIG. 18. After some time, the device is removed or falls off due to sweat or other environmental forces and tattoo 640 is left on the skin as shown in FIG. 19. As shown in FIG. 19a, the release layer 634 can be removed with the upper portion, leaving only adhesive and ink to form tattoo 640. As shown in FIG. 19b, the release layer 634 may be a clear substance that remains on top of tattoo 640 as kind of a protective coating. Finally, as shown in FIG. 19c, release layer 634, evaporates or disintegrates over time to allow the separation of tattoo 640 from the remainder of CID 610. FIG. 20 is a top view of device 610 which shows the printed outer layer while FIG. 21 shows removal of the outer layers and electronic device component 632 which held in place by adhesive 618, to reveal the temporary tattoo the on skin, an unexpected occurrence to the user, and an opportunity to give surprise and delight when previously hidden tattoo 640 is revealed.

Alternatives to the hybrid design described in FIGS. 16-21 include having release layer 634 be activated by time or exposure to moisture or to other elements causing the electronics to fall off over time revealing a combination of adhesive and pigment with visually discernable information on the skin.

An alternative embodiment would place the electronics between the skin and temporary structure, therefore with the protective layer in removed in addition to the structure described above the electronics would persist as well.

There are several potential advantages of a hybrid product, involving a removable initially visible upper portion and a longer-term linked tattoo. The tattoo can be used for a number of potential functions. There may be left a QR authenticating code. In the case of a lost removable portion of the device, it would also provide authentication for the issuance of a new portion of the device then being associated with information which would disable the original lost/damaged portion.

The functionality could have marketing benefits to allow a more persistent engagement with the user and create a new secondary experience once the protective layer is removed thereby allowing companies to have a multi-tiered benefit with separate unique experiences over time with a single product.

In other embodiments, the print can be applied to any layer in the device and it not limited to the print layer.

The upper layer (be it the printed layer or the printed layer and the protective layer) is preferably water resistant. Preferred materials can include non-woven materials which are broadly defined as sheet or web structures bonded together by entangling fiber or filaments (and by perforating films) mechanically, thermally or chemically. They are flat or tufted porous sheets that are made directly from separate fibers, molten plastic or plastic film. The lower (skin abutting) layer provides support, spacer layer that allows for heat and liquid to be displaced and also protects the top layer. In some embodiments, the lower layer also provides moisture to the skin (e.g. lotion, oils, ointments,), preferably through control release mechanisms. Polypropylene may also be used as it is durable lightweight, hypoallergenic yet strong.

In an alternative embodiment, the print layer is not a solid material but more like a paper product comprising small particles, almost like a printable coating or barrier on to the lower layer which could be the electronics component or for embodiments without an electronics component, just the lower layer. The print layer would be substantial enough to allow for printing, hold up against sweat, hair and long-term wear but not strong enough to be pulled on in a single sheet to prevent transfer. Similar to the embodiments shown in FIGS. 16-21, it is contemplated print layer may be spray coated on the electronics component as opposed to being a solid piece. Additionally, micro perforations help with diaphoretic conditions such as excessive sweating.

Another option for added security, is using an ink on the printed layer that is not flexible and breaks up when the print substrate is stretched for example by attempted removal. Thus, the device stays intact protecting the RFID components but is still unusable where visual confirmation is needed.

While illustrative embodiments of the invention have been described, it is noted that various modifications will be apparent to those of ordinary skill in the art in view of the above description and drawings. Such modifications are within the sprit and scope of the invention, which is limited and defined only by the following claims.

What is claimed is:

1. An identification device to be adhered to the skin of an animal having a top side and a bottom side comprising:
    a. a substrate with a top side and a bottom side;
    b. a printable surface with biocompatible pigment displaying visually discernible information disposed on the top side of the substrate;
    c. biocompatible adhesive on bottom side of substrate;
    d. an electronic component below the top side of the substrate comprising an electronic device with the ability to send, receive, and store information; and
    e. a carrier sheet,
    wherein the substrate and the adhesive are flexible, elastic, biocompatible, breathable, and comprised of material allowing for transmission of moisture and vapor at a rate that allows the device stay affixed to the skin for its pre-determined useful timeframe to slow down deterioration of components below substrate and to minimize skin irritation.

2. The device according to claim 1 wherein the substrate comprises a non-woven material.

3. The device according to claim 1 wherein the substrate has a thickness less than 0.001 inch.

4. The device according to claim 1 wherein the substrate has a thickness less than 0.0005 inch.

5. The device according to claim 1 wherein the printable surface comprises an optically scannable code.

6. The device according to claim 5 wherein the optically scannable code is selected from the group consisting of QR code, bar code, and datamatrix.

7. The device according to claim 1 wherein the pigment comprises one or more of the following: metallic ink, reflexive ink, glow in the dark ink, ink that change their physical properties over time, ink activated by a light, inks that retain a charge and emit over time, and thermal ink.

8. The device according to claim 1 wherein the pigment won't disintegrate during its pre-determined useful timeframe.

9. The device according to claim 1 wherein the pigment won't disintegrate during its pre-determined useful timeframe unless device removed or destroyed.

10. The device according to claim 1, wherein the pigment is configured to provide three portions of visually discernable information, wherein the first portion of visually discernible material being positioned, configured and dimensioned to communicate humanly perceptible and humanly readable second information; said second portion of visually discernible material carrying third information encoded within said second portion of said visually discernible material and being positioned, configured and dimensioned to be scanned by an optical device in order to the read said third information encoded within said second portion of said visually discernible material.

11. The device according to claim 1, wherein the adhesive can comprise one or more of the following hydrocolloids, acrylic, silicone, and cyanoacrylate.

12. The device according to claim 1, wherein the adhesive can be activated by liquid, pressure, heat, light, or UV light.

13. The device according to claim 1, wherein the adhesive can be designed to be weaker over a controlled period of time.

14. The device according to claim 1, wherein the electronic component has a top and a bottom and comprises a second biocompatible adhesive on the bottom.

15. The device according to claim 1, wherein the electronic component is flexible and elastic.

16. The device according to claim 1, wherein the printable surface is on the top side electronic component.

17. The device according to claim 1, wherein the electronic component further comprises a second substrate supporting the electronic device.

18. The device according to claim 17 further comprising data processors such as circuits, microchips and microprocessors.

19. The device according to claim 18 comprising one of more of the following RFID, or a near field communication device or a UHF communication device.

20. The device according to claim 18 wherein the electronic component is a passive RFID device comprising a chip and printed circuit.

21. The device according to claim 19 where the RFID sits on a second substrate that is no thicker than what is necessary to support adhesive and information.

22. The device according to claim 1 wherein the carrier sheet further comprises a biocompatible release substrate.

23. The device according to claim 1 wherein the device is compatible for use inside an MRI machine.

24. The device according to claim 1 wherein when substrate is removed from skin, the electronic component stays intact.

25. The device according to claim 1 which is frangible and designed to break apart when the device is removed from the skin.

26. The device according to claim 25 wherein upon the application of mechanical stress said identification device results in the identification device breaking apart electrically, optically and mechanically.

27. The device according to claim 25 wherein the electronic component is designed to break apart when the device is removed from the skin.

28. The device according to claim 25 wherein the substrate has an embedded weak point so that upon removal, the electronic component is disabled.

29. The device according to claim 1 further comprising
   a. a biocompatible adhesive and biocompatible pigment forming a mirror image; and
   b. a release substrate to facilitate the removal of the substrate and the electronic component,
   wherein upon application of the device to the skin of the user, the mirror image is transferred to the skin and upon removal of the substrate and the electronic component, the image is visible.

30. The device as in claim 1, further comprising a protective layer disposed over said top of the substrate.

31. The device as in claim 1, further comprising a windowed frame overlying said top surface, allowing the application of said visually discernible material after assembly of said device.

32. The device as in claim 1, wherein a plurality of identification devices is contained on a single piece of substrate, and the operative identification device portions of the device are kiss cut without cutting said substrate to allow removal of a identification device while leaving said substrate behind after removal of said operative identification device portions.

33. A method of manufacturing the device as in claim 25, comprising assembling the operative elements of the device on a manufacturing assembly substrate which allows the operative elements of the device which are frangible to go through the manufacturing process substantially without damage, and wherein said manufacturing assembly substrate may be removed prior to use.

34. The method of manufacturing as in claim 33, wherein assembly is performed by feeding to the manufacturing assembly substrate successive operative elements of the identification device assembly from rolls comprising a operative element support strip adhered to a plurality of each of the operative elements, causing it to be adhered directly or indirectly to the manufacturing assembly substrate while peeling away the operative element support strip.

35. The method of manufacturing as in claim 34, wherein at least some of the operative elements of the identification device assembly are created using a process selected from the group consisting of printing, silkscreening, brushing, stamping and rollering.

36. A system, comprising the identification device of claim 1 together with a plurality of portable electronic communication devices for wirelessly reading the first information within said wireless device and/or optically scanning and reading said third information encoded by said second portion of visually discernible material and or for receiving and transmitting user inputs from the users of said portable electronic communication devices, a network for receiving said first and third information from said plurality of electronic devices, and a computer coupled to said network to receive said first information, said third information, and said user inputs, said computer including non-volatile storage means having stored there on computer software for controlling said computer and causing said computer to store said first information, said third information and said user inputs, to analyze said first information, said third information and said user inputs to generate database and control information, and to communicate said database and control information over said network to control electronic systems and/or make information available to users on said portable electronic communication devices.

37. The system as in claim 36, wherein the wireless device is program to be accessible only to portable electronic communication devices with an approval code in an application downloaded to such portable electronic communication device.

\* \* \* \* \*